United States Patent [19]

Gosling et al.

[11] 4,382,160

[45] May 3, 1983

[54] METHODS AND APPARATUS FOR ENCODING AND CONSTRUCTING SIGNALS

[75] Inventors: Harold W. Gosling, Weston; Reginald A. King, Tilehurst, both of England

[73] Assignee: National Research Development Corporation, London, England

[21] Appl. No.: 218,462

[22] Filed: Dec. 22, 1980

Related U.S. Application Data

[63] Continuation of Ser. No. 26,727, Apr. 3, 1979, abandoned.

[30] Foreign Application Priority Data

Apr. 4, 1978 [GB] United Kingdom ............... 13135/78
Jun. 12, 1978 [GB] United Kingdom ............... 26728/78

[51] Int. Cl.[3] ............................................. H04B 1/66
[52] U.S. Cl. ............................................. 179/15.55 R
[58] Field of Search ............. 179/1.5 A, 1.5 B, 1.5 C, 179/1.5 D, 15.55 R, 15.55 T; 358/261, 133, 260; 340/347 M

[56] References Cited

U.S. PATENT DOCUMENTS

| | | | |
|---|---|---|---|
| 3,102,165 | 8/1963 | Clapper | 179/15.55 R |
| 3,104,284 | 9/1963 | French et al. | 179/15.55 R |
| 3,278,685 | 10/1966 | Harper | 179/1 SC |
| 3,510,640 | 5/1970 | Voelcker | 179/15.55 R |
| 3,641,496 | 2/1972 | Slavin | 179/1 SM |
| 3,684,829 | 8/1972 | Patterson | 179/1 SA |
| 3,784,754 | 1/1974 | Hagiwara et al. | 179/15.55 R |
| 3,803,358 | 4/1974 | Shirf et al. | 179/1 SM |
| 4,163,120 | 7/1979 | Baumwolspiner | 179/1 SM |

FOREIGN PATENT DOCUMENTS

| | | |
|---|---|---|
| 1948762 | 4/1971 | Fed. Rep. of Germany . |
| 2093539 | 1/1972 | France . |
| 2364520 | 7/1978 | France . |
| 848607 | 9/1960 | United Kingdom . |
| 1155422 | 6/1969 | United Kingdom . |
| 1185095 | 3/1970 | United Kingdom . |
| 1282641 | 7/1972 | United Kingdom . |
| 1296199 | 11/1972 | United Kingdom . |
| 1330880 | 10/1973 | United Kingdom . |
| 1438526 | 6/1976 | United Kingdom . |
| 1501874 | 2/1978 | United Kingdom . |
| 1528344 | 10/1978 | United Kingdom . |
| 1528345 | 10/1978 | United Kingdom . |

OTHER PUBLICATIONS

Robinson, A., "Results of a Prototype Television . . . ", Proc. IEEE, Mar. 1967, pp. 356–359.

Voelcker, "Toward a Unified Theory of Modulation" Part I: Phase-Envelope Relationships, Mar. '66, Proc. of the IEEE, vol. 54, No. 3, pp. 340–351.

Voelcker, "Toward a Unified Theory of Modulation" Part II: Zero Manipulation, May '66, Proc. of IEEE, vol. 54, No. 5, pp. 735–755.

Huffman, "A Method for the Construction of Minimum Redundancy Codes", Sep. 1952, Proc. IRE, vol. 40, pp. 1098–1101.

L. S. Moye, "Digital Transmission of Speech at Low Bit Rates", 1972, Electrical Communication, vol. 47, No. 4, pp. 412–423.

Levin, "Distribution of Zeros of Entire Functions", 1964, Transactions of Mathematical Monographs, Prov. R. I., American Mathematical Society, vol. 5.

Bond et al., "On Sampling the Zeros of Bandwidth Limited Signals", Sep. 1958, IRE Transactions & Information Theory, vol. IT-4, pp. 110–113.

Mathews, "Extremal Coding for Speech Transmission", Sep. 1959, IRE Transactions on Information Theory IT-5, pp. 129.

Sobolev et al., "Simple Methods of Clipped Speech Regeneration", 1969, Telecommunications, vol. 23, No. 3, p. 37.

Logan, "Information in the Zero Crossings of Bandpass Signals", Apr. 1977, The Bell System Tech. Journal, vol. 56, No. 4, p. 487.

Licklider, "Effects of Differentiation, Integration and Infinite Peak Clipping Upon the Intelligibility of Speech", Jan. 1958, Journal of the Acoustical Society of America, vol. 20, pp. 42–51.

Licklider, "The Intelligibility of Amplitude-Dichotomised, Time-Quantized Speech Waves", Nov. 1950, Journal of the Acoustical Society of America, vol. 22, No. 6, pp. 820–823.

Bond et al., "A Relation Between Zero Crossings and Fourier Coefficients for Bandwidth Limited Functions", Mar. 1960, IRE Transactions on Information Theory, (correspondence), IT-6, pp. 51-52.
Morris, "The Role of Zero Crossings in Speech Recognition and Processing", 1972, Conference on Speech Communication, L7, p. 446.
Kusch, "Segment, A Building Block of Speech", Sep. 1967, NTZ vol. 20, No. 9, pp. 495-501.

*Primary Examiner*—Emanuel S. Kemeny
*Attorney, Agent, or Firm*—Cushman, Darby & Cushman

[57] ABSTRACT

A speech waveform is encoded to reduce storage capacity or transmission bandwidth requirements. The invention encodes two features of the time waveform, for example (1) duration of half-cycle, and (2) shape, e.g. number of maxima or minima of the waveform within that half cycle. The duration of each half cycle and the associated shape data constitute a pair of primary-code symbols. Each pair of primary code symbols may be represented by a single secondary code symbol using a mapping table. The number of secondary symbols may be reduced by grouping within the mapping table. Redundant sequences and inefficient transmission codes are deleted for further data reduction. Envelope peak value may be stuffed with the mapped signal for storage or transmission. Corresponding decoding provides speech synthesis.

50 Claims, 21 Drawing Figures

Figure 1:
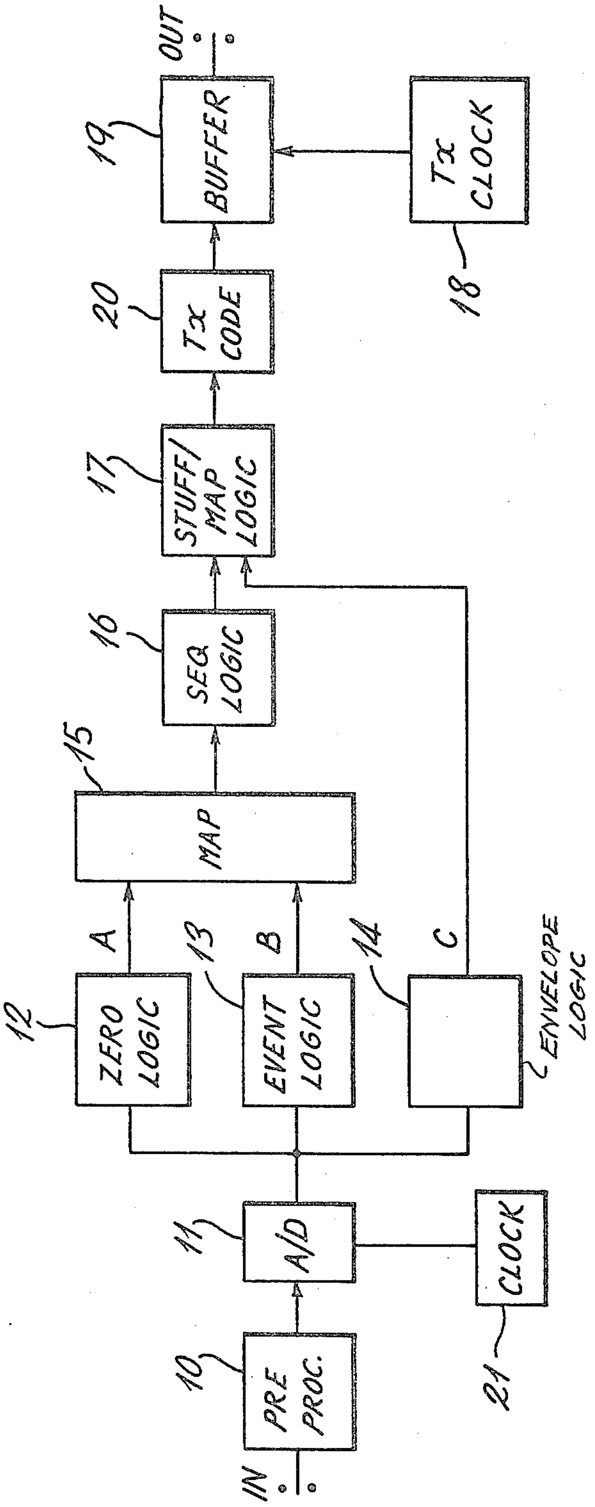

COUNTER
73
GATE
69
EX-NOR
72
BISTABLE
71
GATED BUFFER
70
COMP.
68
REG.
65
REG.
67
CLOCK
21
A/D
11
PRE PROC.
10
MONO-STABLE
60
58
DIFF.
82
SUM
83
COMP.
84
BISTABLE
85
R/S FLIP FLOP
74
BI-STABLE
75
DIFF.
78
MONO-STABLE
80
DIFF.
79
76
PROM
15'
59
COUNTER
61
77
DIFF.
64
MONOSTABLE
63
DIFF.
62
TO SEQUENCE LOGIC

METHODS AND APPARATUS FOR ENCODING AND CONSTRUCTING SIGNALS

This is a continuation of application Ser. No. 26,727 filed Apr. 3, 1979, now abandoned.

BACKGROUND OF THE INVENTION

The present invention relates to methods and apparatus for encoding and constructing signals, and it is particularly, but not exclusively, concerned with the encoding of speech signals or waveforms.

Electrical waveforms derived from human speech are extremely complex in character, having significant components extending from below 300 Hz to above 3 kHz and a wide dynamic range. Such waveforms may be digitized by such known methods as pulse-code modulation, delta modulation or the use of vocoders. These techniques are discussed by L. S. Moye in a paper entitled "Digital Transmission of Speed at Low Bit Rates", Electrical Communication, Volume 47, Number 4, 1972.

It is known that if a speech waveform is infinitely clipped, that is converted into a square wave with zero crossings corresponding to those of the original waveform, the clipped wave is intelligible, when converted back to sound, but severely distorted. In an effort to improve both the intelligibility and naturalness of infinitely clipped speech, the speech waveform has been differentiated before clipping. Although this yields speech of high intelligibility, the number of zero crossings in the resulting square waveform is greatly increased.

The recording or transmission of the square waveform resulting from infinite clipping of speech is equivalent to the signalling of a sequence of time intervals (between successive zero crossings in such a wave) since the amplitude is purely arbitrary. Such intervals have each been converted into a number representing the duration of each interval (see U.K. Patent Specifications Nos. 1,282,641 and 1,296,199 and U.S. Pat. No. 3,684,829 equivalent to the former British specification) but subsequent reconstruction of speech from this sequence of numbers, although an easy matter, is not successful. It is known that the speech sounds so reconstructed are of poor quality and the successive time intervals must be reproduced quite exactly if still further serious deterioration of the reconstructed speech waveform is not to occur. Thus each specifying number must have many binary digits, and allowing for a typical average figure of about one thousand such numbers per second to specify the speech, the binary rate (bits/second) needed to represent the speech waveform is as high as with conventional methods of digital encoding, yet with poorer resultant speech quality.

Attempts to improve speech quality by differentiation before encoding result in more zero crossings; about 1500 to 2000 per second on average. Therefore more numbers per second are required to specify the speech. Improved quality is bought at the cost of still higher bit rates.

Techniques of non-linear coding are known (see the above mentioned Patent Specifications) which reduce the set of distinct numbers required for specifying interval durations, but even when these techniques are applied the bit rate remains high for relatively poor speech quality.

SUMMARY OF THE INVENTION

In this invention, a speech waveform is encoded to reduce storage capacity or transmission bandwidth requirements. The invention encodes two features of the time waveform, for example (1) duration of a sub-division, and (2) shape within that sub-division. A first signal related to the duration of each sub-division and a second signal related to the associated shape data constitute a pair of primary-code symbols. Decoding of the primary-code symbols provide speech synthesis by generating an analog signal having sub-divisions of durations determined by the first signals and a shape determined by the second signals.

A sub-division of a speech waveform, as employed herein, may be defined in any systematic way as long as the alternating component of the speech waveform (which may or may not have a constant component) does not cross through zero more than three times in any one sub-division. Thus, as will be described below, sub-divisions may extend for multiples or fractions of half-cycles. However, in the preferred embodiment, each sub-division extends between adjacent zero crossings, that is, a single half-cycle.

As will be developed below, sub-divisions may be defined in any systematic way. For example, they may be defined with respect to zero crossings. Alternatively, they may be defined with respect to a datum line positioned somewhere other than at zero. In fact, although a datum is usually fixed, it may even vary in a predetermined way. Sub-divisions may also be defined with respect to predetermined maxima and minima (those immediately following a zero crossing, for instance) or between points, such as interpolation zeros (defined hereinbelow), derived from one or more such features. In fact, where sub-divisions extend between the first polarity maximum (defined hereinbelow) following a zero crossing and the first polarity minimum following the next zero crossing, the duration of a sub-division may extend to approximately three zero crossings or almost two half cycles.

The present inventors have realised that since any electrical signal is, in practice, bandwidth limited and each sub-division is by the above definition limited in duration, the waveform shape of each sub-division can be described by a limited number of second signals. Hence second signals are drawn from a limited predetermined set. If bandwidth limiting is employed as is mentioned below a very small useful set of predetermined signals may be obtained. In this invention, the duration of a sub-division is limited to not more than three zero crossings, since any increase beyond this has been found to increase the size of the set of possible second signals to unmanageable proportions for reconstruction.

It will be appreciated that what amounts to satisfactory speech synthesis depends on the use of the invention. For example, in some circumstances it may be sufficient if reconstructed speech can be understood without, for example, the speaker being identifiable from the reconstructed speech, while in other circumstances, for instance in telephony provided by a public service a higher standard is required. For other types of signal than speech other standards are appropriate depending on the circumstances.

Preferably each first signal (indicating sub-division duration) is related to the duration of a half cycle and each second signal (indicating sub-division shape) is related to the number of events, as hereinafter defined, occurring in a half cycle of the signal to be encoded.

In this specification an "event" means any occurrence which can be identified, for example a complex zero (to be discussed below) of a predetermined type or types, or a complex zero which can be identified by association with a minimum or a maximum or a point of inflection; or an "event" may even by the attainment by the signal to be encoded of a specified value.

For convenience in this specification and claims two types of maxima and minima are mentioned: firstly magnitude maxima and magnitude minima which refer to maxima and minima on the basis of magnitude not polarity; and secondly polarity maxima and polarity minima which refer to value in the positive sense not magnitude.

In this specification and claims the term a "half cycle" of a signal means the interval between successive attainments by the signal of a predetermined datum value, the said value being a value attained by the signal from time to time and not necessarily being zero. The datum value is usually constant but may vary in a predetermined way. Where the datum is zero, or is offset to zero, the duration of a half cycle may be determined exactly by measuring the interval between real zeroes (RZ) in the signal to be encoded or it may be determined approximately by for example measuring the interval between the first polarity maximum in a positive half cycle and the first polarity minimum in the succeeding negative half cycle or vice versa, these maxima and minima being known as pseudo zeros (PZ); or by measuring the interval between zeros found by interpolation between the last polarity maximum in a positive half cycle and the first polarity minimum in the succeeding negative half cycle or vice versa, these zeros being known as interpolation zeros (IZ). Both pseudo and interpolation zeros are discussed below. Since according to the above definition polarity maximum and minimum here refer to the value of the signal in the positive sense, the first polarity minimum of a negative half cycle is the first magnitude maximum in that half cycle, that is magnitude disregarding polarity.

It will be clear from the above that in determining the lengths, shapes or number of events, a half cycle need not be determined between real zeros, but may for example be determined between corresponding points in successive portions of a signal waveform which occur between real zeros.

Further, it should be noted from the above definition of the term "half cycle" that where a signal is wholly positive or wholly negative with respect to the datum, that is it touches but does not cross the datum, the half cycle extends between the signal touches the datum and the next time the signal reaches the datum.

Successive pairs of first and second signals may advantageously be derived from successive sub-divisions consisting of successive half cycles of the signal to be encoded. Where successive half cycles of the signal to be encoded occur, at least at times, in groups in which half cycles are substantially the same or the half cycles occur in clusters in which the same sequence of half cycles is present, the method of the invention may include deriving first signals and second signals from at least one (not necessarily the same one) but not all of the half cycles in each group or cluster.

Each pair of primary code symbols, consisting of a first signal and a second signal may be operated on by encoding it as a secondary signal (note the secondary signals are distinct from the second signals mentioned above), each secondary signal being selected in accordance with the primary-code symbol using a mapping table. Primary-code symbols need not uniquely define secondary signals. In fact, one secondary signal may represent any primary-code symbols in a group in which first and/or second signals have adjacent or closely related values.

The methods and apparatus of the invention may be applied to any varying waveform but the invention is particularly advantageous in encoding electrical signals representing speech and other sound signals. Other examples of waveforms which can usefully be coded include sonar, radar, waveforms generated by remote sensors and by medical and other instrumentation transducers, where a simple code is useful in recognising the significance of a signal received. Obviously, these waveforms must have an alternating component which includes the desired data, and may or may not have a direct or constant component which may be eliminated or ignored.

Each first and/or second signal may comprise a plurality of sub-signals each contributing to the description of that first and/or second signal, respectively.

The signal to be encoded may be derived from another signal, such as a signal representing speech for example by single or multiple integration or differentiation.

Some advantages which may be obtained from some embodiments of the invention will now be discussed.

By using the invention speech may be adequately represented by about 1,000 symbols per second where each symbol represents a pair comprising one said first signal and one said second signal relating to one half cycle. This is a reduction in the number of distinct symbols per second required for example in the techniques described in the above mentioned Patent Specifications and less than any of the conventional direct waveform coding schemes described in the above mentioned paper by L. S. Moye.

Further it has been discovered that the symbols which result from a speech waveform encoded by generating first and second signals for every half cycle are highly redundant and that a large percentage may be omitted to reduce the average symbol rate further without loss of speech intelligibility. By this means speech may be adequately represented by about 300 symbols per second.

In view of the low bit rate needed to encode speech, the invention is advantageous for recording, since the number of bits to be stored per second of speech is much reduced. In transmission by line or radio the low bit rate means that a narrower bandwidth is required for transmission than for conventional systems.

The reduction of speech signals to a low number of symbols enables speech synthesisers to be simplified since the symbols may then be stored in a small memory and called for decoding according to the speech sound required. Other sounds can also be economically synthesised in a similar way.

Speech encoded according to the invention can be greatly modified if so desired, before reconstruction. For example by duplicating certain symbols the duration of a speech sound can be extended without altering its pitch or naturalness. Every fourth symbol may, for instance, be duplicated before reconstruction of the encoded waveform, resulting in about 25% reduction in speaking speed without change of pitch. Similarly periodically suppressing symbols by suppressing every fourth symbol increases the speed of speech by 25% again without substantial variation of pitch.

The duration of each half cycle of the reconstructed waveform may be systematically changed in relation to the encoded waveform in order to change the pitch of speech. If this change is carried out at the same time as symbols are omitted, as mentioned in the previous paragraph, it is possible to change the pitch of speech without altering the apparent speed of speaking. This technique is advantageous in such applications as the processing of helium speech in order to increase its intelligibility, and for translating spectral components of the speech signal and shaping its amplitude in apparatus for use by the partially deaf.

Speech encoded according to the invention is markedly more resistant to corruption by noise or interference than are other known methods of encoding and reconstruction.

Speech and speech-like sounds may be converted into an encoded or digital form which facilitates their automatic identification, for example by a computer.

Apparatus of the present invention may include an analogue to digital (A/D) converter such as a known pulse code modulation circuit to convert an analogue input signal into a series of digital signals representing the instantaneous amplitudes of the analogue signal at times when samples were taken. The polarity bit from the A/D converter provides a convenient indication by its change of value of the occurrence of real zeros (RZs).

At least two storage means each capable of storing one sample may be coupled to the output of the A/D converter in such a way that a sample and the preceding sample are both stored. The apparatus may then include a comparator for comparing the samples held by the two stores to detect the occurrence of magnitude maxima and/or magnitude minima, and a first counter for counting the number of magnitude maxima and/or magnitude minima detected.

The apparatus may also include a clock pulse generator coupled to a second counter and means for causing the first and second counters to read out and be reset each time the polarity bit from the A/D converter changes sign. The outputs from the counters which may be series or parallel, thus provide successions of separate first and second signals.

Means may be provided for detecting psuedo zeros in the waveform to be encoded by comparing the contents of the two storage means to detect the first polarity maximum in each positive half cycle and the first polarity minimum in each negative half cycle, these being the PZs for half cycles having the polarities mentioned; and/or means for detecting interpolation zeros by detecting the last polarity maximum in each positive half cycle and the first polarity minimum in negative half cycle and interpolating between this maximum and minimum to determine an IZ. Switch means may then be provided for enabling a choice to be made between RZs, PZs and IZ, in determining the length of half cycles and the number of events which occur in each half cycle.

As has been mentioned the events which may be counted in generating second signals can take many different forms, for example magnitude maxima or magnitude minima or points of inflection, but another useful general form which includes magnitude maxima and minima are complex zeros. An explanation showing how waveforms can be specified in terms of complex zeros and real zeros is now given. Any "entire" function (see "Distribution of Zeros of Entire Functions" by B. J. Levin, Vol. 5, Translations of Mathematicl Monographs, Providence RI, American Mathematical Society, 1964; "Towards a Unified Theory of Modulation" by H. B. Volecker, pt. 1 Proc. IEEE, Vol. 54 pages 340-353, March 1966 and pt. 2 Proc. IEEE May 1966 pages 735 to 755; and "On Sampling the Zeros of Bandwidth Limited Signals" by F. E. Bond and C. R. Cahn, IRE Transactions on Information Theory, Vol. IT-4, pages 110 to 113, September 1958) may be precisely specified by the location of its RZs and its complex zeros (CPZs) but the reconstruction of the original entire function from this information is a complicated process. Additionally while locating the RZs of a time function is a relatively simple process, the CPZs in general are not physically detectable and there is no known practical method of identifying and locating all the CPZs from a knowledge of the continuous function. Differentiation converts a percentage of CPZs into RZs and it can be shown that repeated differentiation will eventually transform all CPZs to RZs. However the process of differentiation is not practical for converting all CPZs to RZs because the number of differentiations required may in some circumstances be infinite. Equally the original waveform, after conversion to a wholly RZ signal by repeated differentiation, can, theoretically, be recovered by a number of integration operations, sometimes an infinite number of such operations.

In practice repeated differentiation is a troublesome transformation because noise, and out of band signal characteristics, can be severely disruptive and, further, in applications where bit rate and bandwidth conservation are important, differentiation increases the zero crossing rate and hence the symbol rate for transmission.

Bandwidth limited speech and many other information bearing and/or naturally occurring waveforms may be regarded as entire functions.

The present invention may operate efficiently by identifying the locations of all real zeros of a waveform together with the locations of that subset of the total set of CPZs of the waveform which may be derived relatively simply, for example by differentiations. This subset of CPZs is called the derived complex zeros subset (DCPZs).

By determining the locations of the RZs and the DCPZs of a signal to be encoded and together with a knowledge of the way in which the DCPZs were identified, then the reconstruction of a close approximation to the original function is possible and quite practical.

It will be understood that while magnitude maxima, magnitude minima and points of inflection have been mentioned in this specification, complex zeros associated with other features may be identified and used as "events" in coding a signal.

The present inventors have discovered that for many band limited waveforms and for speech in particular if RZs are grouped with their associated DCPZs to provide code symbols then an unusually flexible, economical and robust code is provided which is extremely tolerant to distortion, to quantisation errors and to interpolation errors. It has been found that an adequate reconstruction may be performed from the coded symbols which comprise firstly, the coded duration of a sub-division defined as extending between successive RZs, and secondly, the coded number of DCPZs associated with each sub-division, the precise location of the DCPZs within the sub-division being relatively unimportant.

Further, for speech signals, using this code, locations of zeros (IZs) may be simply interpolated from the locations of specified DCPZs, that is for example a polarity maximum and a succeeding polarity minimum.

For some purposes locations of successive zeros (PZs) may be assumed to coincide with the location of certain other specified DCPZs, that is for example two successive polarity maxima. This technique is advantageous under conditions where, for instance, high background noise disturbs the locations of RZs in a speech waveform. IZs and PZs may be used without significant loss of intelligibility.

As has been mentioned the shapes of sub-divisions of band limited signals can be described by a limited number of second signals such as the second signals obtained by counting events, thus such second signals form a predetermined set (the first signals also form a predetermined set for similar reasons). Shapes of sub-divisions can, of course, be analyzed in many other ways than with reference to numbers of complex zeros, for example by Fourier Analysis or a Hadamard transform. In a simple example of Fourier Analysis, amplitude samples of a sub-division are multiplied by corresponding samples in a fundamental sine wave having a half cycle of duration equal to the sub-division, and in a number of sine-wave harmonics of the fundamental. The products obtained are summed for the fundamental and for each harmonic and the fundamental or harmonic giving rise to the largest sum is characteristic of the shape of the sub-division. The fundamental and each harmonic can then be represented by a signal in a group of predetermined signals, and appropriate signals are chosen as second signals according to the shapes of sub-division. Hadamard transformation is a well known process generally similar to the process described above with the main exception that the sine wave multiplying signals used for a Fourier Analysis are replaced by rectangular waveforms.

Apparatus for translating primary-code symbols to secondary symbols may include reduction mapping logic means, such as a programmable read only memory (PROM) for translating symbols from the counters (primary symbols corresponding to the first and second signals) into a reduced number of secondary symbols. By using the reduction mapping logic two reductions in the number of bits required for transmission can be made:

Firstly, a number of primary symbols having values which are adjacent may be grouped so that when applied to the mapping logic they generate the same secondary symbol. For example at the higher end of the speech frequency spectrum, three primary symbols represented by X, Y and Z may all be represented by a single secondary symbol Y'. At the lower end of the spectrum where the durations of half cycles are long, larger groups of primary symbols may be represented by the same secondary symbol.

Secondly, since the input signals are bandwidth limited only a certain number of partial symbols representing durations of sub-divisions can occur. For example in speech waveforms, limited to between 300 Hz and 3 kHz with a certain sampling rate of say 20,000 samples per second, only a half cycle durations longer than a certain number of quanta are likely to occur. The harmonic content of speech is well known and it is also found that those partial symbols representing the number of events are strictly limited (that is to those symbols corresponding to the predetermined set of second signals) and in addition each of these partial symbols only occurs with a certain limited number of partial symbols representing half cycle duration.

As a result it has been found that the mapping logic need only have 27 or fewer secondary symbols (these being described as an alphabet of symbols) which can each be represented by a 5 bit binary number when linearly encoded.

These remarks apply to speech in the English language but are believed to be true at least for other Western European languages. They may also be valid more widely.

While the reduction mapping logic is not required in some applications where bandwidth reduction is not important such as the processing of helium speech it can be varied in other applications such as encryption for example where "expansion mapping" can be usefully employed. In expansion mapping, the first n primary symbols are mapped by symbols chosen from a first set $x_1$, the second n primary symbols are represented by symbols from a second set of secondary symbols $x_2$ and so on so that the $n^{th}$ set of primary symbols are represented by symbols from a set of $x_n$ secondary symbols to give an n-fold expansion of the original alphabet in a predetermined or pseudo-random manner.

The possibility of omitting symbols has been mentioned; in this way a further bandwidth reduction may be achieved by the inclusion of sequence reduction logic which omits symbols on a systematic basis by, for example, omitting every second symbol or every third symbol or every second and third symbol. Alternatively the sequence reduction logic may recognise all or some symbols and then omit one or more succeeding symbols in accordance with the symbol detected. The first of these alternatives does not detract from intelligibility on reconstruction provided for example at least one in three to one in eight of the original samples is retained but at the extreme reconstructed speech is "musical" in character if a repetitive reconstruction process is adopted. In the second alternative it is known that certain symbols occur in long sequences of repetitive clusters. If one of these symbols is transmitted and the next, for example, seven removed, then a more natural reconstruction is possible by reproducing the sequence of eight typical symbols from the cluster each time a symbol described above is detected.

Further reduction of bandwidth may be achieved by use of non-linear Entropy encoding logic which encodes secondary symbols as tertiary symbols having different numbers of bits, the most frequently occurring secondary symbols being replaced by short tertiary symbols and vice versa. Suitable codes are known as Huffman codes and are described in "A Method for the Construction of Minimum Redundancy Codes", Proc. IRE, Vol. 40, pages 1089–1101, September 1972 by David A. Huffman. Entropy codes other than the Huffman code may also be used to advantage.

The quality of waveforms reconstructed from signals encoded according to the method of the invention can be improved by including "envelope" information specifying amplitude, packing (that is waveform shape) or frequency ratio, for example. In one embodiment a symbol representing the amplitude of the signal to be encoded may be included at specified intervals in the encoded signal. Such a signal can be derived from the information supplied by the A/D converter each time a predetermined number of secondary symbols has been generated and may represent the average peak amplitude of the samples represented by these symbols.

Decoding apparatus, according to the present invention may comprise decode mapping logic, for example a PROM, which receives secondary or tertiary symbols and provides output signals at first and second output channels representative of first and second primary symbols giving the lengths of half cycles and number of events in half cycles respectively. The decode mapping logic may also have channels which provide a signal specifying silence, and/or envelope information such as amplitude or packing or frequency ratio information if such information is incorporated in the encoded signal.

Reconstruction logic may also be provided in the form of a PROM. In one arrangement the reconstruction logic may be capable of providing constant duration rectangular pulses at four different levels: a comparatively high positive level, a comparatively low positive level, a comparatively low negative level and a comparatively high negative level. The reconstruction logic, in operation, then provides either all positive or all negative contiguous pulses for each half cycle, the number of pulses being equal or proportional to the partial symbol representing the length of a half cycle and the levels of the pulses being determined according to a predetermined scheme such as each event being represented by an equal number of equal amplitude signals while the next event is represented by the same number of symbols all of a different level.

In particular where the events are magnitude minima the smaller level may be half the greater level and each magnitude minimum represented by the smaller level pulses is preceded and followed by an equal number of high level pulses. Although this simple rectangular waveform is non-optimum it is highly intelligible. Significant improvements in quality can be achieved by tailoring the reconstruction process more closely to known statistical properties of, for example, speech signals. Thus since the amplitude distribution of spectral components of the speech signal falls with increasing frequency improvements in quality may be obtained:

(a) by making the amplitude of the reconstructed signals a function of the primary symbol so that signals associated with long half cycles are reconstructed with amplitudes greater than those associated with shorter half cycles, and (b) by adjusting the maximum to minimum pulse height so that larger amplitude signals have a smaller maximum/minimum ratio than smaller amplitude signals.

For example if the maximum amplitude of a given symbol on reconstruction is P then the minimum value may be $P-\sqrt{P}$ units. A variety of maximum/minimum ratios is possible and the optimum is different for each particular application.

Where symbols were omitted in encoding the apparatus according to the fourth aspect of the invention may include, optionally as part of the reconstruction logic, sequence insertion logic.

The insertion logic carries out the inverse of the reduction logic for example by inserting half cycles having the same waveform as the preceding half cycle if symbols were removed on a systematic linear basis. Instead where symbols were removed according to a symbol detected then the insertion logic is constructed to generate half cycles according to the symbols which were removed so that the original long sequence of symbols is reconstructed on the detection of the first symbol of the sequence.

Although various additional features of the invention have been described as modifications to the apparatus it will be realised that analogous additional method features may be employed.

Computers, including microcomputers and microprocessors, may be employed in putting the methods and various forms of apparatus of the invention into practice. Thus some, or all the method steps may be carried out using a computer and all or part of such apparatus may be formed by a computer. Where digital computers are used analogue-to-digital converters and digital-to-analogue converters are also usually required.

Figure 2:
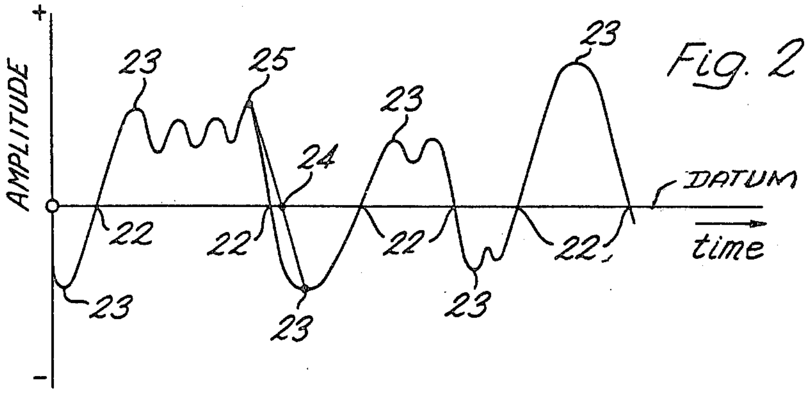
Figure 3:
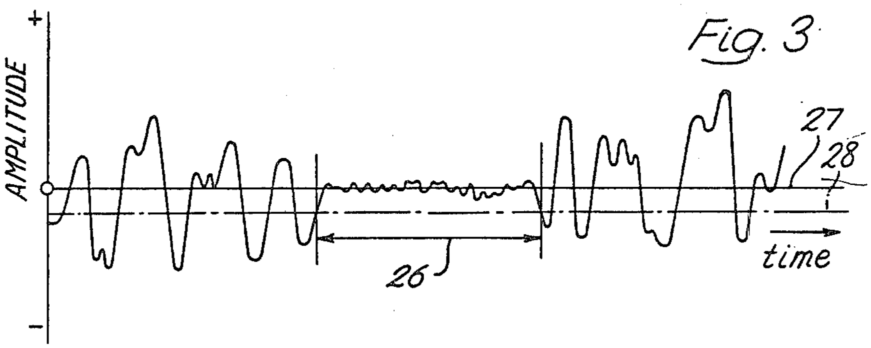
Figure 4:
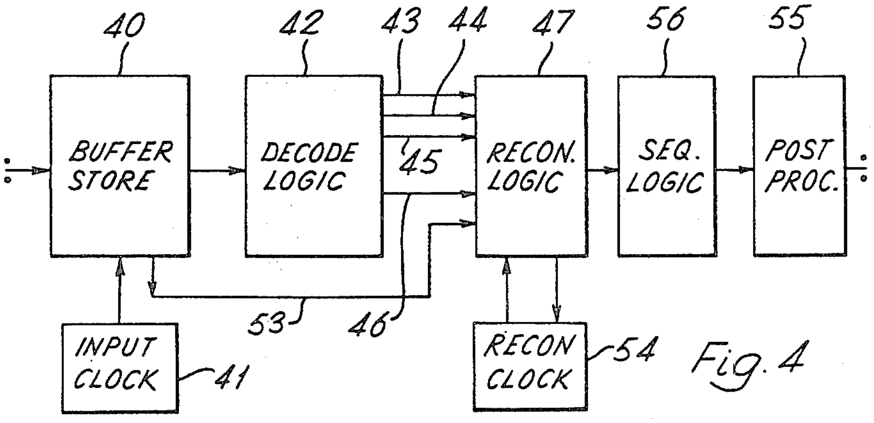
Figure 5:
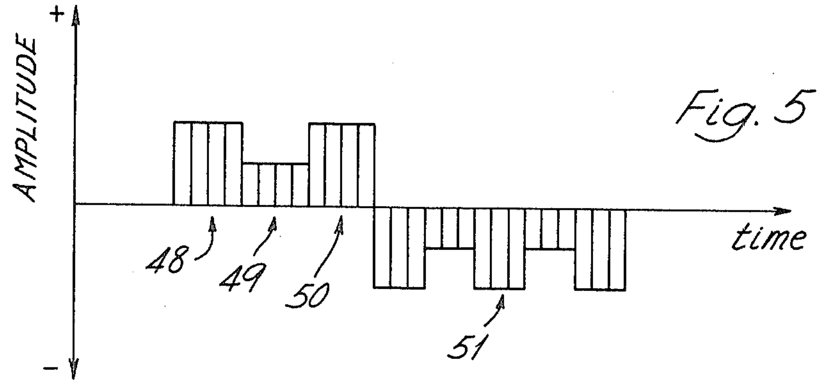
Figure 6:
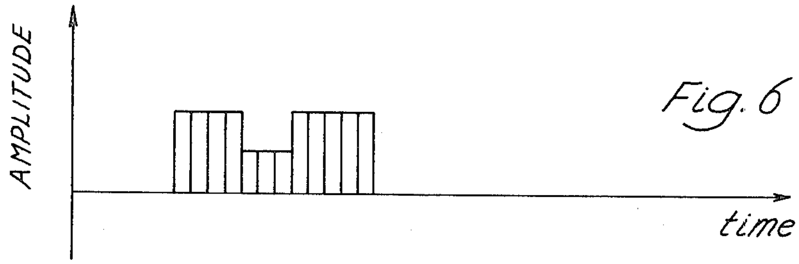
Figure 10:
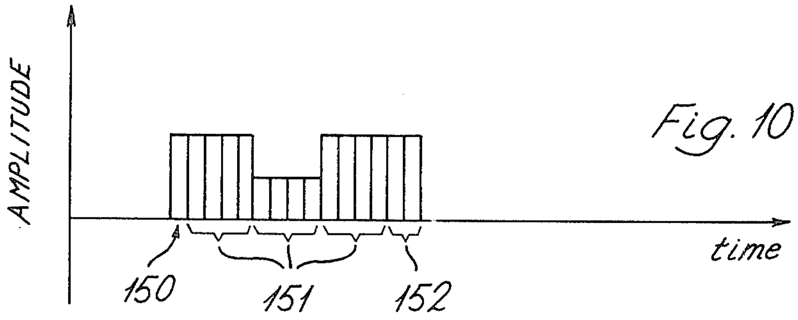
Figure 7:
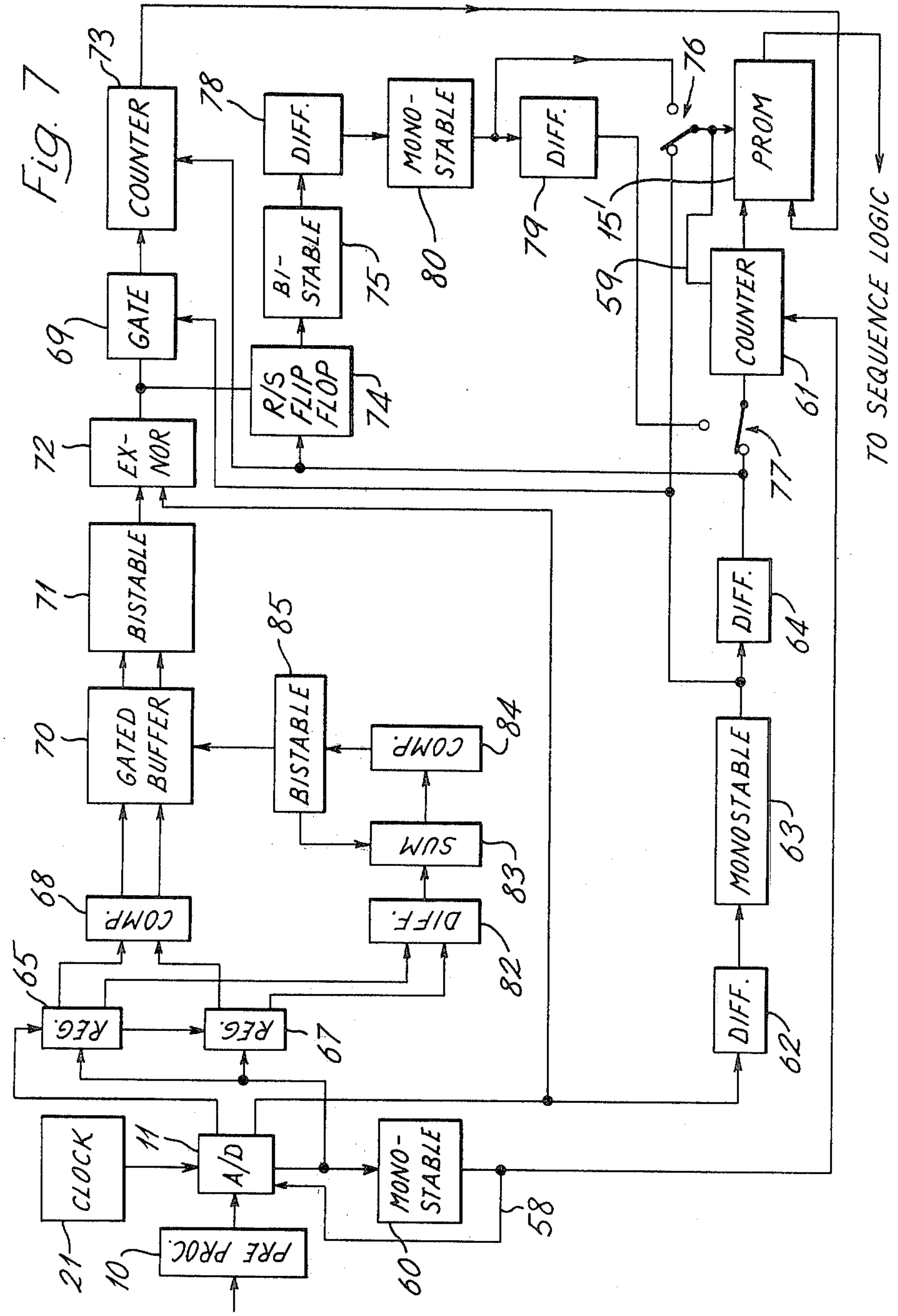
Figure 8:
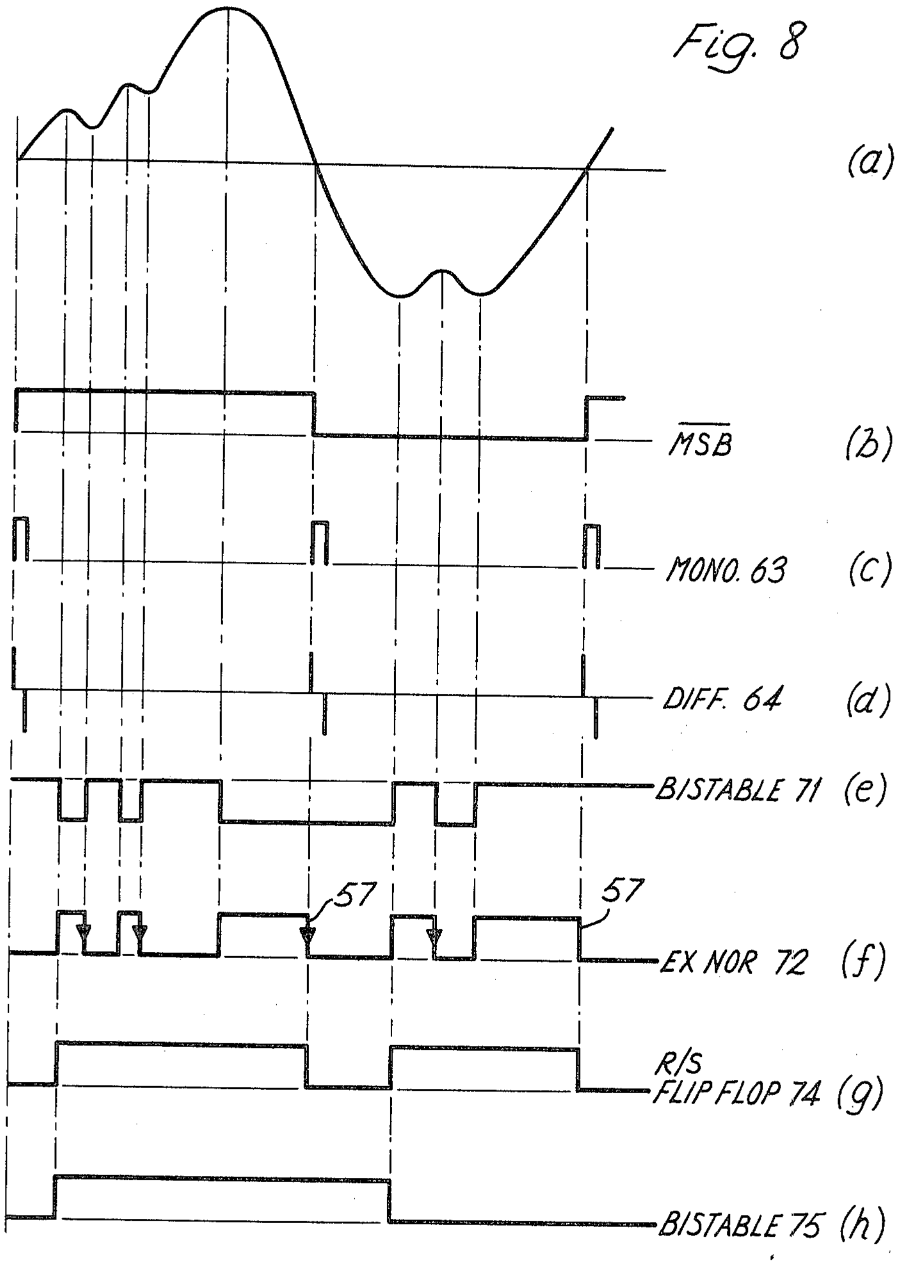
Figure 9:
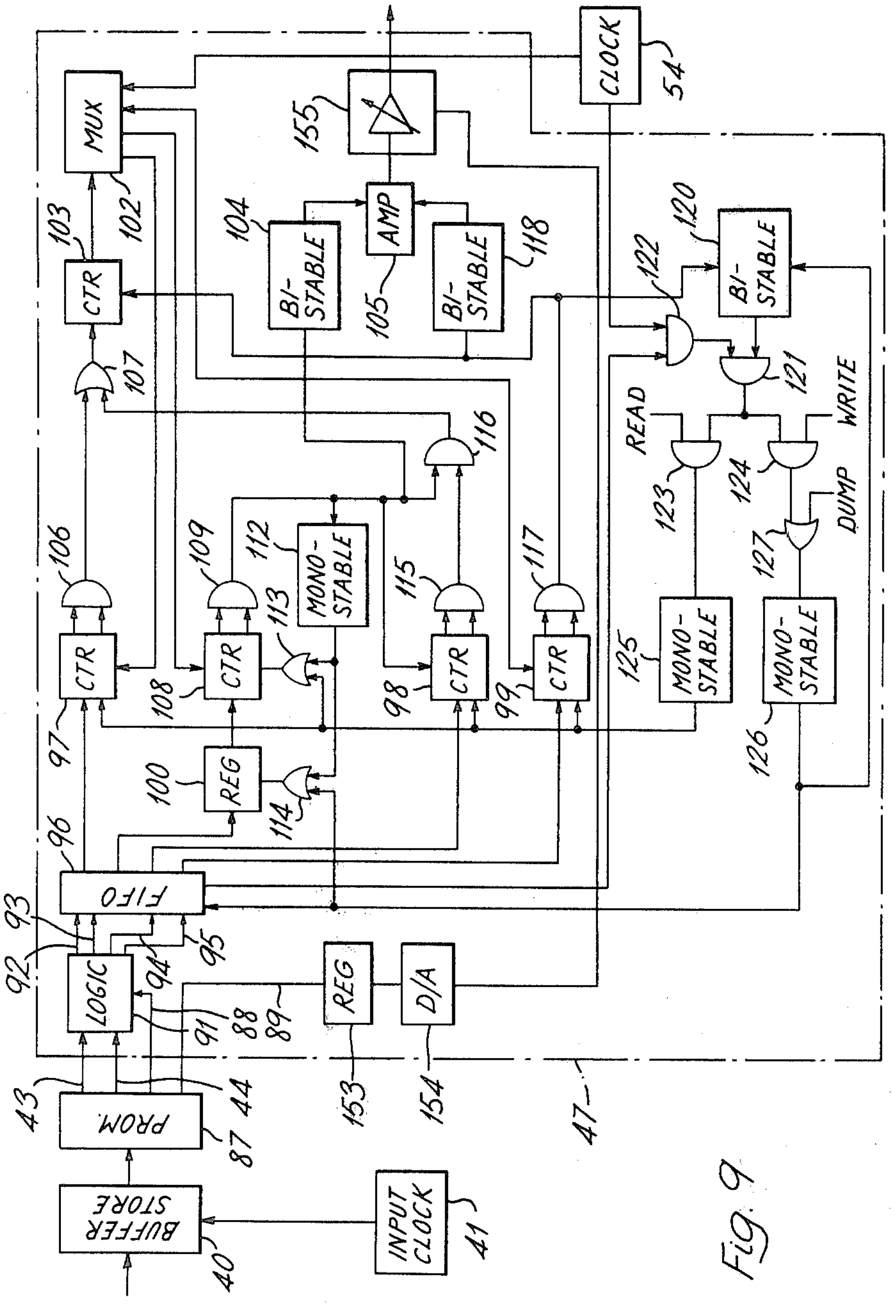
Figure 11:
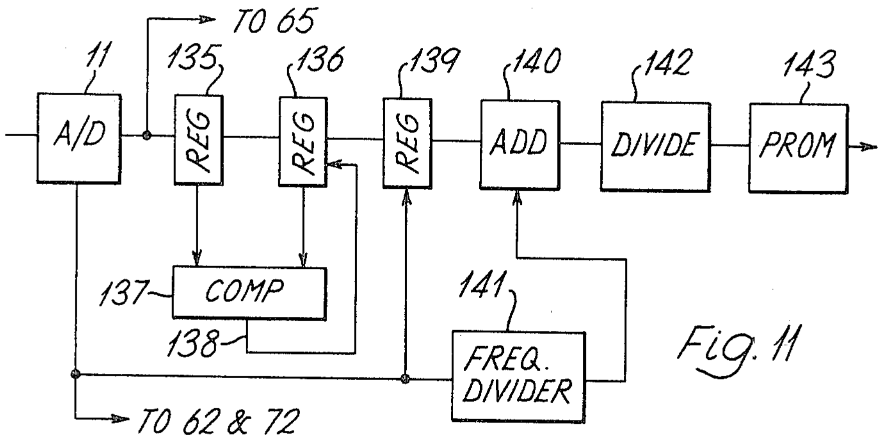
Figure 12:
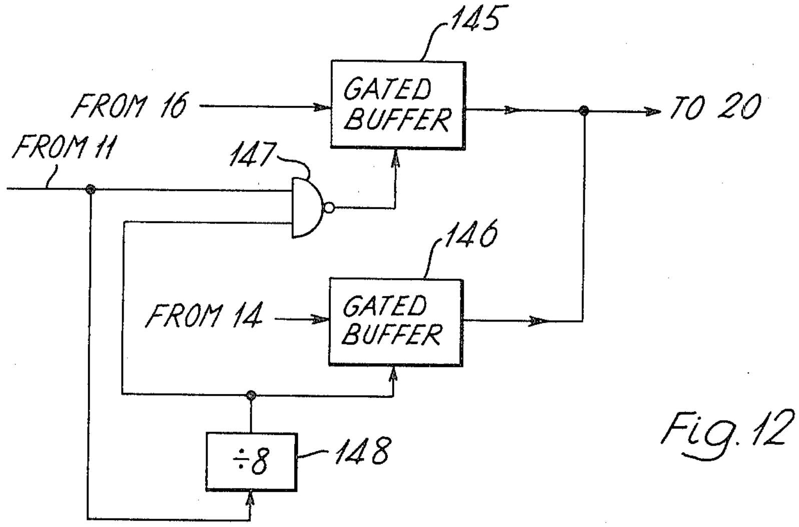
Figure 13:
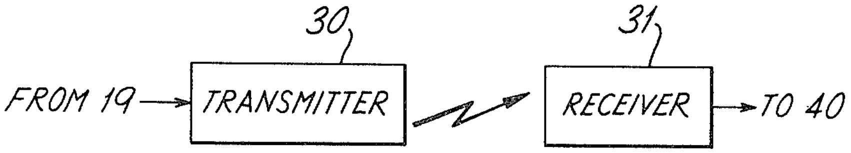

Certain embodiments of the invention will now be described by way of example, with reference to the accompanying drawings, in which:

FIG. 1 is a block circuit diagram of apparatus according to the third aspect of the invention for encoding speech signals, FIGS. 2 and 3 are waveforms used in explaining the operation of the apparatus of FIG. 1, FIG. 4 is a block circuit diagram of apparatus according to the fifth aspect of the invention for reconstructing speech waveforms from code symbols generated by the apparatus of FIG. 1, FIGS. 5 and 6 are waveforms used in explaining the operation of FIG. 4, FIG. 7 is a block diagram of part of an encoder according to the invention, FIGS. 8(a) to 8(h) show waveforms used in explaining the operation of FIG. 7, FIG. 9 is a block diagram of part of a decoder according to the invention, FIG. 10 shows a waveform used in explaining the operation of FIG. 9, FIG. 11 shows an example of the envelope logic 14 of FIG. 1, FIG. 12 shows an example of a stuffing circuit which may be used for the circuit 17 of FIG. 1, and FIG. 13 is a block diagram of a radio link between the apparatus of FIG. 1 and that of FIG. 4.

In FIGS. 1, 4, 7, 9, 11, 12 and 13 a single line between blocks may either be a single connection, or channel, or a group of connections or channels.

In FIG. 1 an audio signal, for example from an amplifier coupled to the output of a microphone, is passed to a preprocessing circuit 10 where the signal may be band-pass filtered, and subjected to constant volume amplification so that small but significant fluctuations are amplified to a suitable level for subsequent circuits. Constant volume amplification is important where the input signal has a wide dynamic range. In the preprocessing circuit 10 the input signal may also for example be differentiated or integrated according to noise conditions, low frequency noise being reduced by differentiation and high frequency noise by integration. In addition a d.c. signal may be added for the purpose of eliminating, as is explained below, the large number of zero crossings which occur when noise appears in periods of silence. In addition the preprocessing circuit may carry out one or more of the following known processes: syllabic companding, spectral shaping, frequency shifting and spectral inversion.

The output signal from the preprocessor 10 is passed to an A/D converter 11 which may for example be a conventional pulse code modulation (PCM) encoder and which is driven by a clock pulse generator 21 to take, for 3 KHz speech bandwidth for example, about 20,000 samples per second, each sample being encoded as a 10 bit number.

The A/D converter 11 is in general driven by a clock pulse generator 21 having a rate several times faster than the Nyquist sampling rate, a factor of two to ten times the Nyquist rate being typical. In this way, the highest frequencies will be coded by two to ten samples respectively, ensuring that no significant required contributions of the input waveform are lost. Since the durations of half cycles are measured by the number of operations or samples from the A/D converter, each time quantum in which such durations are measured occurs several times in a half cycle. Thus for 20,000 samples per second each quantum equals $1/20{,}000^{th}$ of a second.

The output from the A/D converter 11 is passed to three logic circuits: a zero logic circuit 12, an event logic circuit 13 and an envelope logic circuit 14.

If the zero logic is to determine the intervals between real zeros then a counter may be used to count clock pulses and this counter may be caused to read out and be reset to zero each time the polarity bit from the A/D converter changes sign. Thus the first signals mentioned above are derived. More details of the zero logic are given below in connection with FIG. 7.

As has been mentioned, under certain conditions, it is useful to be able to determine the duration of half cycles by measuring the time interval between IZs or PZs. For this reason the zero logic 12 may also determine when such zeros occur. Interpolated zeros are obtained by interpolation between the last polarity maximum before an RZ zero and the first polarity minimum (i.e. the first magnitude maximum disregarding polarity) after the RZ.

The differences between the three types of zeros will now be exemplified with reference to FIG. 2 which shows an arbitrary waveform intended to represent a speech waveform after any preprocessing which may have taken place in the preprocessor 10 but before analogue to digital conversion. The datum used for determining sub-divisions is, in this example, the horizontal line. RZs in this waveform are of course the points 22 and PZs are represented by the points 23 and it can be seen that very approximately the intervals between successive points 23 are equal to intervals between successive points 22. One type of IZ is illustrated at point 24 and it is found by constructing a mathematical model in the IZ/PC logic of a straight line between the last polarity maximum 25 before a real zero and the first polarity minimum 23 after a real zero. The point where the straight line cuts the time axis is one type of interpolation zero.

The event logic 13 identifies and counts the number of magnitude maxima and/or magnitude minima in one half cycle. If the number of magnitude minima only is required the logic 13 may subtract one from a count of magnitude maxima and minima and then divide by two. Alternatively the event logic may count magnitude minima directly. Thus the second signals mentioned above are derived.

As discussed above, and as is well known in the art, derived complex zeros (DCPZs) can be derived from the waveform by differentiation and are thus associated with magnitude minima. Thus, in FIG. 2, the magnitude minima shown are associated with complex zeros.

When a magnitude maximum or minimum occurs, successive samples in the neighbourhood may be greater than or smaller than the previous sample due to the effect of noise or to uncertainty in digitising the samples. For this reason the logic circuit 13 includes fluctuation logic which determines when a magnitude maximum or minimum has really occurred. More details of the event logic are also given below in connection with FIG. 7.

The envelope logic circuit 14 may derive signals containing amplitude information and packing or frequency ratio information. To obtain amplitude information the envelope logic computes the average of the peak values of the input waveform over a number of successive time coded samples. Dependent upon the application this may be averaged over as many as 20–30 time coded samples, or as few as one or two time coded samples.

The envelope logic may also compute and code information regarding the way in which the CPZs are packed within the RZ time interval. This facilitates more effective reconstruction at the receiver. This information may only be required for certain symbols or groups of symbols. As an example of the utility of packing, a long RZ interval with only two DCPZs can be more realistically reconstructed if the transmitted code indicates that the two DCPZs are packed closely together or that they are widely spaced.

Signals from the zero logic 12 and the event logic 13 are applied to a map and code logic circuit 15 which may for example be a programmed read only memory (PROM). The circuit 15 substitutes numbers representing the secondary symbols of an alphabet for each pair of numbers or primary symbols generated in the logic circuits 12 and 13. As has already been mentioned the number of primary symbols which can be generated is limited if the output signal from the preprocessing circuit 10 is band limited for example to signals between 300 Hz and 3 KHz. Furthermore primary symbols can be grouped and the symbols of each group can be represented by the same secondary symbol, the groups being selected on a non-linear basis. The constitution of such groups has already been discussed and it has been stated that in this way the secondary symbols in the alphabet at the output of the circuit 31 can easily be reduced to 27 without significant loss of intelligibility on decoding. An example of input combinations and output symbols is given in Table 1.

TABLE 1

| Length of half cycle (in time quanta) | Number of Magnitude Minima | | | | | |
|---|---|---|---|---|---|---|
| | 0 | 1 | 2 | 3 | 4 | 5 |
| (1) | | | | | | |
| (2) | | | | | | |
| (3) | 1 | | | | | |
| 4 | 2 | | | | | |
| 5 | 3 | | | | | |
| (6) | 4 | | | | | |
| (7) | | | | | | |
| (8) | | | | | | |
| (9) | 5 | | | | | |
| (10) | | 6 | | | | |
| (11) | | | | | | |
| (12) | 7 | 8 | | | | |
| (13) | | | | | | |
| (14) | | | | | | |
| (15) | | | | | | |
| (16) | 9 | | | | | |
| (17) | | 10 | 11 | | | |
| (18) | | | | | | |
| (19) | | | | | | |
| (20) | | | | | | |
| (21) | 12 | 13 | | | | |

TABLE 1-continued

| Length of half cycle (in time quanta) | Number of Magnitude Minima 0 | 1 | 2 | 3 | 4 | 5 |
|---|---|---|---|---|---|---|
| (22) | | | 14 | | | |
| (23) | | | | 15 | | |
| (24) | | | | | | |
| (25) | | | | | | |
| (26) | | | | | | |
| (27) | 16 | 17 | | | | |
| (28) | | | 18 | 19 | | |
| (29) | | | | | 20 | |
| (30) | | | | | | |
| (31) | | | | | | |
| (32) | | | | | | |
| (33) | 21 | 22 | | | | |
| (34) | | | 23 | 24 | 25 | |
| (35) | | | | | | |
| (36) | | | | | | |
| (37) | | | | | | 26 |
| (38) | | | | | | |
| (39) | | | | | | |
| (40) | | | | | | |

The first column gives the length of each half cycle and brackets indicate the lengths which are grouped and coded using the same symbol. Each of the other columns is headed with a number of magnitude minima and contains a number representing one character in the alphabet of secondary symbols. For example, a half cycle of duration 22 quanta and one magnitude minima is coded 13 as is one of duration 19 quanta with one magnitude minima. In Table I the above mentioned predetermined set of second signals is represented by the six numbers 0 to 5 at the heads of the columns (except the first column).

It will be clear to those familiar with entering look-up tables into PROMs how to enter Table I into a PROM. Suitable PROMs for the circuit 15 and the other PROMs mentioned in this specification include the INTEL types 2704 and 8704 which are 512×8 bit PROMs. The use of these devices is fully described in the manufacturer's data. In general a PROM receives an x bit address and can be programmed to provide a y bit output, and input and/or output may be parallel or series. The devices specifically mentioned above employ a nine bit address and provide an eight bit output. In effect each combination of a number in the first column of Table I with a number in the row representing magnitude minima is a possible input signal to the PROM which must be catered for at the input side of the PROM in binary form. Thus the PROM is programmed to give an output symbol (in binary form) for each possible input signal, the symbols being those of the alphabet of Table I. Where spaces occur in the table a symbol cannot occur, due to band limiting but the PROM is nevertheless programmed with the symbol to the left of the space in case due to erroneous working such an input combination does occur; for example a half cycle of duration nine quanta with two or more minima is coded 6. Silence is coded as symbol 27 (not shown in Table I) and whenever a "half cycle" of duration 41 to, say, 64 time quanta occurs it is coded as symbol 27. For durations longer than 64 quanta counting is in 64 time quanta units as is explained in connection with FIG. 7.

The waveform of FIG. 3 represents a speech waveform but it includes an interval 26 of silence in which a noise signal occurs.

Since the noise signal has many zero crossings it would cause counts to be generated in the counters of the zero and event logic circuits 12 and 13 which would give rise to misleading encoded signals. The horizontal axis 27 in FIG. 3 relates to the waveform at the input of the preprocessor 10 but the chain dotted horizontal axis 28 relates to the same waveform after the addition of a d.c. signal in the preprocessor 10. After addition of the D.C. signal, the chain dotted axis 28 forms the datum for determining sub-divisions. It will be seen that no zero crossings occur in the interval 26 in the output signal from the preprocessor 10. Thus if the counter of the zero logic circuit 12 measures an interval of greater than a predetermined duration it is an indication that an interval of silence has occurred.

Quite a high proportion of secondary symbols may be omitted before transmission without significant loss of intelligibility on decoding. This technique has also been mentioned above where both the omission of fairly large groups of symbols representing short half cycles and perhaps every other symbol representing a long half cycle have been discussed. In FIG. 1 sequence reduction logic 16 is provided to omit secondary symbols on the basis of Table II, for example.

TABLE II

| Secondary Symbol | Divide by |
|---|---|
| (1) | 10 |
| (2) | |
| (3) | |
| (4) | |
| (5) | |
| (6) | |
| (7) | |
| (8) | |
| (9) | |
| (10) | |
| (11) | 3 |
| (12) | |
| (13) | |
| (14) | |
| (15) | |
| (16) to (40) | 2 |

For instance using Table II where secondary symbol 5 occurs only every sixth symbol is passed to the next circuit. The sequence reduction logic 16 may comprise a first-in first-out (FIFO) store (not shown in FIG. 1) comprising a series of registers. A number read into the store is transferred in parallel from register to register when clock pulses are received and also read out in this way. If the circuit receiving numbers read out is activated to a read mode only every sixth of those pulses applied to the FIFO store then five symbols are omitted.

The sequence logic 16 may alternatively be implemented using a PROM (not shown) which receives the secondary symbols shown in Table II as address signals and is programmed to provide the numbers shown in the right hand column of Table II. These numbers are read into a counter (not shown) which is decremented each time the MSB signal from the A/D converter 11 changes sign. The counter is connected to a gated buffer circuit (not shown) positioned as part of the logic circuit 16 between the output of the circuit 15 and the input of the circuit 20. Each time the counter reaches zero the gated buffer is enabled allowing one symbol to reach the circuit 17 and the PROM is enabled to receive another symbol from the circuit 15.

After sequence reduction the secondary symbols are passed to a stuffing/mapping logic circuit 17 where the amplitude information from the logic 14 is "stuffed" into the symbol stream or mapped into the code. In the former process after every $p^{th}$ symbol, a symbol representative of peak average amplitude at that time is inserted, where p may for example be in the range 1 to 20 and is typically 8. In the latter process if the original time coded alphabet consists of the 26 symbols 1 to 26 then symbols 27 to 52 may for example be utilised for amplitudes between zero and a first level, symbols 53 to 79 for amplitudes between the first and a second level and so on. It should be noted that for some applications, the transmission/stuffing/mapping of envelope information may be restricted to low amplitude symbols only, or to other special groups of symbols.

As has been mentioned, the envelope logic 14 may also include circuits for providing a packing signal indicating the way in which events are packed into, or distributed in, each half cycle. For example the position of each maximum and minimum in terms of the number of time quanta from the beginning of a half cycle may be stored and signals representing some or all of these signals may be mapped, or possibly stuffed, into the stream of signals from the sequence logic circuit 16. A five-bit code allows thirty-two symbols to be transmitted, and thus if twenty-six or twenty-seven symbols are used as secondary symbols five or six symbols may be used for packing information, assuming amplitude information is stuffed not mapped. For selected symbols representing, for example, long half cycles with few minima one of two symbols is derived from the positions of minima. This scheme allows five or six of the symbols in bottom left corner Table I to be duplicated to represent different packing and then selected on the basis of the packing detected in the signal received. Packing information may either be mapped using a PROM employed for the circuit 15 or a further PROM may be positioned somewhere in the series of circuits between the circuit 15 and the circuit 20. Some further information on deriving packing information is given later in relation to FIG. 7.

While the symbols from the logic circuit 17 may be transmitted at regular intervals by way of a buffer store 19 under the control of a transmitter clock pulse generator 18, as 5 bit numbers, for example, a further reduction in bit rate and therefore bandwidth may be achieved by the use of Entropy codes as codes mentioned above, such as "Huffman" codes. For example with multiple bit PCM the symbols used in the code may be positive or negative and each may have two states such as two levels. Each symbol then begins with a positive or negative signal having a magnitude of two units which is then followed in some cases by a further one or more positive or negative one unit signals. The most used symbols are the shortest and comprise simply one of the positive and negative two unit signals, the next most frequently used signals comprise a two unit signal (positive or negative) followed by a single unit signal (positive or negative), and so on. Such output symbols may be generated by a transmission code logic circuit 20 comprising a further PROM (not shown) and then passed to the buffer store 19.

Signals arrive at the buffer store 19 at an irregular rate for various reasons including the use of symbols of similar length for half cycles of differing lengths, the use of the sequence and stuffing/mapping logic and the use of the circuit 20. A radio transmitter 30 (see FIG. 13) for example or a land line need to be regularly loaded and this aim is achieved by the buffer store 19 whose output is clocked regularly from stored signals sufficient to even out signals for transmission.

For decoding after transmission by way of for example a radio or telephone line link the encoded signals may be applied to the arrangement shown in FIG. 4. A buffer store 40 receives signals for example from the transmitter 30 (FIG. 13) by way of a receiver 31 which, where Entropy codes are used is preceded by a decoder (not shown), which converts the Entropy code symbols into digital signals. Signals received by the buffer store 40 are read out sequentially without discontinuity under the control of an input clock pulse generator 41. The store 40 may be a conventional FIFO store or a set of FIFO stores. Signals from the store 40 are applied to a decode logic circuit 42 where the inverse of the operations carried out by the map 15, and the stuff/map logic circuit 12 of FIG. 1 are carried out for example by applying digital signals representing secondary symbols to a PROM which then provides as its output, signals in four channels 43 to 46 representing the duration of each half cycle, the number of minima occurring in each half cycle, each amplitude signal which was coded, and a packing signal specifying the way in which the signal is to be reconstructed, respectively. Obviously, the signals representing duration and shape must be related to the duration and shape signals generated by zero logic 12 and event logic 13 no matter how much processing is performed on these duration and shape signals produced by the encoder or how signals are transferred from buffer 19 (FIG. 1) to buffer store 40.

Basically the PROM is programmed so that for example when one of the secondary symbols shown in the columns of Table I (other than the first column) is received a primary symbol in two parts is generated at the PROM output. The first part is a number representing the number in the first column opposite the symbol, and the second part is a number representing the number of minima at the head of the column containing the symbol. Note that where a secondary symbol was generated from any of a number of time quanta in a group, only a particular number of time quanta is regenerated from the symbol. This number is different, in some cases, for different numbers of minima for symbols derived from the same group. For example the secondary symbol 9 causes the regeneration of a first part of a primary symbol representing 16, since in Table I the symbol 9 is opposite 16, but the symbol 10, generated from the same group of time quanta 14 to 18, causes the regeneration of a first part of a primary symbol representing 17.

The symbol 27 is decoded as a primary symbol having a first part of 50 and a second part as zero.

The programming of the PROM in the logic circuit 42 will now be clear from Table I but it should be noted that where amplitude is to be recovered also, Table I may be extended to form several fields each as shown in Table I but each corresponding to a separate amplitude as illustrated in Table III:

TABLE III

| | |
|---|---|
| TABLE I symbols 1 to 26 | 1st AMP RANGE |
| As TABLE I, but symbols 28 to 54 | 2nd AMP RANGE |
| As TABLE I, but | 3rd AMP |

TABLE III-continued

| symbols 55 to 81 | RANGE |
|---|---|

Each received signal as mentioned above is coded 1 to 26, 28 to 54, or 55 to 81 corresponding to the three sections of Table III and assuming that symbol 27 is reserved to denote silence, so that if for example symbol 28 is received, it is decoded by the PROM as 3 quanta of duration, zero magnitude minima, and within the second amplitude range.

Packing information, mentioned above, and dealing with the way CPZs are packed within half cycles is dealt with in a similar way to amplitude information.

Alternatively, if amplitude and/or packing information is in the form of extra symbols "stuffed" into the bit stream received by the decode logic 42, a FIFO store, appropriately clocked, may be used to read the additional symbols into the channel 46.

The channels 43 to 46 are applied to a reconstruction circuit 47 which may also comprise a PROM.

In its simplest form the waveform reconstructed has a rectangular envelope as shown in FIG. 5. If each symbol received by the reconstruction logic comprises a number A representing the length of a half cycle and a number B representing the number of magnitude minima in that half cycle then the reconstruction circuit 47 first derives M and N according to the following equations $M=2B+1$ and $N=A/(2B+1)$. The reconstruction circuit is then designed to provide N pulses at a fixed amplitude followed by N pulses at half the fixed amplitude followed by N pulses at the fixed amplitude and so on until M groups of N pulses have been generated. For example with reference to FIG. 5 if $A=12$ and $B=1$ then the circuit 47 provides internally the numbers $N=4$ and $M=3$. The internal generator accordingly generates a block of four full amplitude pulses 48, a block of four half amplitude pulses 49 and then a block of four amplitude pulses 50. By this time the process of producing pulses has been carried out three times and a waveform half cycle has been generated. If the next symbol received by the circuit 47 has $A=15$ $B=2$ then the resulting waveform is as shown at 51 in FIG. 5.

For silence $A=64$ $B=0$, so a full height pulse, typically of many periods of 64 time quanta is produced. A fixed voltage of this type produces a period of silence.

With this simple reconstruction strategy, the ratio of maximum to minimum value of the reconstructed waveform is fixed at 2:1 and the time intervals between discontinuities in each half cycle are evenly spaced. However, any other suitable fixed ratio and/or interval may be used dependent on the characteristics of the signal being processed.

This simple, evenly spaced, rectangular waveform is highly intelligible but is clearly non-optimum and some of the factors which can advantageously be taken into account in devising other reconstruction stategies have already been mentioned.

However another strategy will be illustrated here with the aid of FIG. 6. When PZ coding is used then the last time interval of the reconstructed signal may be extended at the expense of the preceding ones to give improved quality. Thus if $A=12$ and $B=1$ the reconstructed waveform may have a block of four full-height pulses followed by a block of three half height pulses followed by a block of five full height pulses as shown in FIG. 6.

Where a PROM is used in generating rectangular waveforms such as those shown in FIGS. 5 and 6, the symbol represented by the numbers A and B is presented to the PROM and the resultant mapped output is unique for that symbol. It may consist of a series of bits, appearing at different PROM output terminals in parallel, each corresponding to a pulse and specifying whether that pulse is to be full height or half height, for example by taking the values "one" and "zero", respectively. These bits are then passed to a pulse generating circuit (not shown) for generating equal length pulses each of one of the required two amplitudes.

However, a smoothed version of the rectangular waveform may be produced by grouping the output bits from the PROM as words having, for example, four bits in each word specifying the amplitude of a pulse to be generated. Such a bit stream is then passed to a digital-to-analogue converter to generate the required waveform and quantisation noise can be removed from the waveform by a linear low pass filter.

An alternative way of deriving a smoothed form of the rectangular waveform is to use a pair of commercially available dynamic filters each of which receives the rectangular waveform and whose outputs are summed. One of the dynamic filters which is a band-pass filter passes the high frequencies corresponding to the maxima and minima, and the other dynamic filter which is a low-pass filter passes only the low frequencies corresponding to half cycle duration. The outputs from the filters are added and a smoothed waveform is generated.

In order to ensure that the reconstruction circuit 47 always generates an appropriate output, a signal indicative of the number of symbols held by the store 40 is passed to the circuit 47 by way of a channel 53. In this way slight variations in the clock rate from a clock 54 controlling the logic 47 can be made, if required, to spread out symbols and lose time if the buffer store 40 is nearly empty or to squeeze up symbols and gain time if the store 40 is nearly full. In this way at least a partial correction is made in irregularities in the rate at which signals pass between the buffer store 40 and the output of the logic 47.

Gross variations in the reconstruction clock rate from the generator 54 will alter the spectral occupancy of the output signal. For some applications the reconstruction clock rate will not be the same as the quantisation clock rate. In the processing of helium speech for instance the difference may be a factor of four or five times.

Where symbols have been omitted before a transmission using sequence reduction logic sequence insertion logic 56 is used to re-introduce symbols. If the logic 56 includes a FIFO store and for example all symbols were reduced by a factor of three before transmission, the FIFO store may be clocked three times each time one symbol is in the output register so that this symbol is read-out three times. Where long groups of symbols representing short half cycles were omitted another PROM may be used to generate a typical group of such symbols each time one such symbol is applied to the input of the PROM. For example the PROM may receive signals at its address terminals and be programmed to generate an appropriate output number depending on the symbol which can then be used to clock the FIFO and provide a number of symbols equal to the number read out from the PROM.

The sequence logic 56 also allows symbols to be repeated, or withheld dependent upon the size of the buffer store 40 and its symbol occupancy. Thus if the buffer store is nearly empty, the sequence logic may repeat successive samples more often than otherwise required, to prevent the buffer store emptying further. Similarly if the buffer store is rapidly filling up, the logic may repeat successive samples less often than otherwise, or even suppress samples to prevent the buffer store overflowing. This latter strategy may be used to reduce the size of buffer store needed and to prevent discontinuities or gaps occurring in the symbol stream.

The waveform generated by the reconstruction logic 47 is passed to a processing circuit 55 which may be the inverse of the preprocessing circuit 10 and therefore may subtract a d.c. signal and/or integrate or differentiate the waveform received to provide the final output waveform. Low-pass or band-pass filtering and spectral shaping or inversion may also be carried out together with expanding, or any inverse amplitude processing required as a result of the preprocessing adopted. Post processing may also include dynamic filtering as described above in connection with waveform reconstruction if not included in the logic circuit 47.

One embodiment of an encoder according to the invention will now be described in more detail with reference to FIG. 7. The zero logic 12 and the event logic 13 of FIG. 1 is shown in more detail in FIG. 7 where the A/D converter 11 and a PROM 15' used as the circuit 15 are also shown.

That output of the A/D converter 11 which signals that the converter is ready for read-out is applied to a dual monostable circuit 60, that is two monostable circuits in series, one providing a delay and one providing pulses. The pulses are passed to the converter 11 by way of a connection 58 to cause the next sample to be read out, the delay being chosen so that read-out is at the appropriate time. The pulses are a suitable length for a counter 61. Each count reached by the counter 61 is proportional to the length of a half cycle of the signal applied to the A/D converter 11 since the counter is reset at the end of each half cycle in the way which will now be explained. The most significant bit (MSB), that is the sign bit, from the A/D converter 11 is applied to a differentiator 62 so that each edge of the MSB waveform produces a pulse. A monostable circuit 63 changes this pulse into a pulse of predetermined duration (see FIG. 8(c)) which is applied to a further differentiator 64. The negative going output of the differentiator 64 (FIG. 8(d)) resets the counter 61 immediately after the end of each half cycle.

As has been mentioned silence periods are counted in 64 time-quanta units, each such unit producing the symbol 27 at the output of the PROM 15'. For this purpose the "carry" instruction from the counter 61 which can hold a maximum count of 64 is passed by way of a connection 59 to "enable" the PROM 15' before the counter returns to zero. This process is repeated until the next RZ, IZ or PZ is detected. Additional or alternative logic may be employed to enable groups of 64 quanta or numbers other than 64 to be selected for representation by the symbol 27 or another "non speech" symbol such as 28 or 29.

The output from the A/D converter 11 is passed to a register 65 under the control of the clock pulse generator 21 each time the A/D converter is ready for read-out as signalled by the dual monostable 60 along line 58 and the current contents of the register 65 are passed on to a register 67 at the same time. Thus a comparator 68 is able to compare the current and previous output from the A/D converter in order to determine whether a maximum or minimum has occurred. The output from the comparator 68 is passed by way of a gated buffer circuit 70 to a bistable circuit 71, the object of the gated buffer being to prevent minor fluctuations in level, due to last bit uncertainty or noise, being treated as a genuine maximum or minimum. The control of this buffer is explained below.

Provided the gated buffer 70 is open the bistable circuit 71 changes state each time the current sample is greater than the previous sample or vice versa. For example FIG. 8(a) shows a waveform applied to the input of the A/D converter 11 and the waveform of FIG. 8(e) shows how the bistable circuit 71 changes state to conform to this waveform. An EX-NOR gate 72 receives one input from the bistable circuit 71, and one from the MSB output of the A/D converter 11 so that its output is as shown in FIG. 8(f). It will be seen that the arrowed edges of the esclusive NOR output of FIG. 8(f) are equivalent to the number of polarity minima in each positive half cycle and polarity maxima in each negative half cycle of the waveform of FIG. 8(a) and this number is counted by a counter 73, the edges designated 57 being gated out by a gate 69 controlled by the output of the monostable 63. This counter is reset each time the differentiator 64 provides a reset pulse (see FIG. 8(d)).

The arrangement of FIG. 7 allows PZs to be used instead of RZs by taking the output of the EX-NOR gate 72 and applying it to an R/S flip-flop circuit 74 which is reset by the signal from the differentiator 64 and has an output waveform as shown in FIG. 8(g). The output from the latch circuit 74 is passed to a bistable circuit 75 which it will be seen from FIG. 8(h) changes state each time the first polarity maxima occurs in a positive half cycle and the first polarity minima in a negative half cycle; that is the waveform of FIG. 8(h) changes state at every pseudo zero. The output from the bistable circuit 75 is treated in the same way as the most significant bit from the A/D converter 11 to provide an alternative input for the counter 61 and a PROM enable signal for the PROM 15' by the use of semiconductor switches 76 and 77, differentiators 78 and 79 and a monostable circuit 80.

The outputs from the counters 61 and 73 are applied to the PROM 15' when the PROM enable signal is received by way of the switch 76; and the PROM output is taken to the sequence logic 16 as shown in FIG. 1. Signals to and from the PROM 15' may be transferred either as serial pulses in a single channel, or as parallel pulses in parallel channels.

One example of the fluctuation logic controlling the gated buffer circuit 70 will now be described. A number, for example four, of the least significant bits in the registers 65 and 67 are passed to a difference circuit 82 which provides an output proportional to the difference between the applied signals. These differences are summed in an up/down counter 83 so that where fluctuation occurs the sum contained by the counter 83 increases and decreases. However if the sum accumulated becomes greater than a predetermined reference value which is proportional to the fluctuation error allowed, then a comparator 84 provides an output for a bistable circuit 85 which opens the gated buffer circuit 70. At the same time the sum circuit 83 is reset.

By varying the reference value allowances can be made for differing expected errors in the comparator 68 and for differing noise levels.

An example of the envelope logic 14 is now described in more detail with reference to FIG. 11. Samples from the A/D converter 11 are passed first to a register 135 and then to a register 136. A comparator 137 compares the sample in the register 136 with that in the register 135 and if the former is larger than the latter an enable signal is sent via a connection 138 causing the sample in the register 136 to be passed to a register 139.

The MSB signal from the A/D converter 11 is passed as an enabling signal to the register 139 to cause it to pass its contents to an adder 140 each time a half cycle ends. Thus at the end of each half cycle the register 139 contains the sample having the largest amplitude in that half cycle and this sample is added to the contents of the adder 140.

The MSB signal is also passed to a frequency divider 141 which provides a read-out signal for the adder 140 after the MSB signal has changed R times, where R is the number of samples over which the average is to be taken. The contents of the adder 40 are divided by R in a divider circuit 142 to provide the average maximum half cycle amplitude before being passed to a PROM 143. The programming of the PROM is such that it provides a look-up table in which each amplitude average gives rise to a digital signal or symbol ready for stuffing or mapping in circuit 17. The registers 65 and 67 and the comparator 68 of FIG. 1 may be used instead of the additional registers 135 and 136, and the comparator 137.

The stuffing/mapping logic circuit may be a PROM when mapping is to be carried out, and if so then part of each address supplied to the PROM comes from the sequence logic 16 while the remainder comes from the PROM 143 of FIG. 11. The mapping PROM is programmed to provide, according to applied address signals, output symbols which may for example be as indicated in the first column of Table III above.

For stuffing the arrangement shown in FIG. 12 may be used. Gated buffer circuits 145 and 146 are connected to receive signals from the map and code logic circuit 15 and the envelope logic circuit 14, respectively, of FIG. 1 and their outputs are both connected to the transmission code logic circuit 20. The MSB signal from the A/D converter 11 is applied by way of a NAND gate 147 to allow signals to be gated from the buffer circuit 145 to the circuit 20 each time the MSB signal changes, except when a signal from a divide-by-eight circuit 148 is applied to the NAND gate. The divide circuit 148 also receives the MSB signal but only provides an output signal for every eighth change of the MSB signal. The buffer circuit 146 is enabled by signals from the divide circuit 148 so that on each eighth MSB change a signal from the envelope logic is passed to the transmission logic 20 but at this time the NAND gate 147 is closed and no signal is read from the buffer 145. Since signals from the circuit 16 are held by the buffer 145 for a long time compared with the time the NAND gate 147 is closed, all signals from the circuit 16 reach the circuit 20; further signals from the envelope logic 14 are simply injected between signals from the circuit 16.

The registers 65 and 67 and the comparator 68 may also be used to derive packing information. Further counters (not shown), one for, and associated with, each of the five possible minima of Table I, are then provided and each counts pulses from the dual monostable circuit 60 until its associated minima is detected. Thus each counter holds a number representing the time between the beginning of a half cycle and the occurrence of a minimum. When intervals between minima are required the contents of different counters are subtracted. One or more divider circuits (not shown) are used to divide the contents of the counter 61 at the end of each half cycle by the contents of the said further counters, to provide a ratio which may, for example be simply classified as greater or smaller than four. The former indicates that minima are relatively close together and the latter that they are relatively widely spaced. Thus a binary signal is provided which indicates one of these possibilities and is suitable for application to one of the PROMs already mentioned in connection with packing.

An example of the reconstruction logic 47 in FIG. 4 is now described in more detail with reference to FIG. 9.

Signals from the buffer store 40 are applied to a PROM 87 forming the decode logic 42 shown in FIG. 4. However in the system described in relation to FIG. 9 the output of the PROM while comprising the length of half cycle signal A in channel 43 and the number of minima B in channel 44, also contains packing information in channel 88 and averaged amplitude information in channel 89. A logic circuit 91 which may be a PROM generates the two numbers M and N already referred to in connection with FIG. 5. Numbers $P_1$ and $P_2$ mentioned below are also generated from information in the channel 88. These numbers are read out in channels 92 to 95, respectively. Alternatively the outputs of the PROM 87 to generate the numbers M, N, $P_1$ and $P_2$ directly through the PROM program and the logic circuit 91 is omitted. The possible outputs from the PROM 87 can be regarded as defining a set of possible shapes for half cycles of analogue signals generated by the apparatus of FIG. 9. From the number M, N, $P_1$ and $P_2$ a waveform similar to that shown in FIG. 5 can be built up but the packing information allows modification by the addition of a number of full height preload pulses at the beginning of each half cycle and another number of full height post load pulses at the end of each half cycle.

For example a half cycle such as that shown in FIG. 10 might be specified for reconstruction by a predetermined preload signal $P_1=1$, $M=3$, $N=4$, and a postload signal $P_2=2$, in which case, as shown in FIG. 10, there would be a first single full height pulse 150 corresponding to $P_1=1$, three groups of pulses 151 corresponding to $M=3$, four pulses in each group corresponding to $N=4$ and two full height pulses at the end 152 corresponding to $P_2=2$. The packing may be similar for each half cycle or it may vary either with A and B or with an envelope signal sent from the encoder either as a separate signal or as part of the alphabet of transmitted symbols.

The information in the channels 92 to 95, where logic circuit 91 is employed, is passed to a FIFO store 96 where it is read out to counters 97, 98 and 99 and a shift register 100. The counter 97 receives the preload information $P_1$. The number representing this information is counted down to zero by means of the reconstruction clock 54 which passes pulses by way of a multiplexer 102 which is under the control of a counter 103.

While the counter 97 is being counted down to zero, a bistable circuit 104 applies an input to an amplifier circuit 105 comprising two summing amplifiers in series. The bistable 104 is connected to the second summing amplifier which also receives an input from the first summing amplifier. The polarity of this latter input is under the control of a bistable circuit 118. The phases of the output signals of the two bistable circuits are such that the output of the amplifier circuit 105 is maximum positive until the counter 97 reaches zero. An AND gate 106 then passes a signal by way of an OR gate 107 to the counter 103 which then causes the multiplexer 102 to start passing clock pulses to a counter 108 which has received the number N from the register 100. As the counter 108 is counted down to zero the amplifier 105 continues to provide its maximum positive output. However when the counter 108 reaches zero an AND gate 109 is opened and the bistable circuit 104 is set to its other state so that the output of the amplifier 105 is now at reduced positive level. If the pulses of FIG. 10 correspond to the clock pulses of the reconstruction clock 54 it will be seen that pulses corresponding to the preload information $P_1$ and the first group of N pulses have now been generated at the output of the amplifier circuit 105.

The output from the gate 109 causes a monostable circuit 112 to provide an output signal for OR gates 113 and 114 resetting the counter 108 and reading the same number N into the counter 108 from the shift register 100. In addition the output pulse from the gate 109 decrements counter 98 to which the number M has been transferred.

The cycle of reading the counter 108 down is now repeated until the gate 109 again indicates that the counter is empty when the bistable 104 changes it state again so that the output of the amplifier 105 returns to the maximum positive level and the counter 98 is counted down by one more step. In this way it can be seen that a number of blocks of pulses N of alternate maximum and reduced amplitude are generated at the output of the amplifier 105 but when the counter 98 reaches zero as indicated by the output of an AND gate 115 an enable signal is applied to an AND gate 116. After the counter 108 is counted down again to zero the signal from the output of the gate 109 opens and the AND gate 116 which moves the multiplexer 102 on one more stage by way of the OR gate 107 and the multiplexer control counter 103. Clock pulses are now routed to the counter 99 which has received the post-load number $P_2$. While the counter 99 is counted down the amplifier 105 provides its maximum positive output but when a gate 117 indicates that the counter 99 is empty the counter 103 is reset to zero and the bistable circuit 118 is operated to change the level of an input signal to the first summing amplifier in the amplifier circuit 105. This first summing amplifier receives a positive going square wave from the bistable 118 and a negative offset voltage, of relative levels such that when the bistable 118 changes state, the output of the first summing amplifier changes polarity. Thus the output of the amplifier circuit 105 also changes polarity. The relative levels of the input signals to the second summing amplifier are such that the maximum positive and negative excursions are equal as are the reduced level positive and negative excursions.

In order to reset the circuit for the reconstruction of the next half cycle the output from the gate 117 changes the state of a bistable circuit 120 applying an enable signal to an AND gate 121. As soon as the FIFO 96 is ready for read-out an enable signal is applied to an AND gate 122 which opens at the next clock pulse opening the AND gate 121 and applying enable signals to the AND gates 123 and 124. When a read signal is applied to the AND gate 123 a monostable circuit 85 provides a pulse which presets the counters 97 to 99 and 108. When a write pulse is applied to the AND gate 124 a monostable circuit 126 receives an input pulse by way of an OR gate 127 and the FIFO 96 is caused to read-out into the counters 97 to 99 and the register 100. At the same time the bistable circuit 120 is set to its other state in which the AND gate 121 is not enabled. Thus it can be seen that the reconstruction logic 47 is now set up to provide the next half cycle with the opposite polarity to that of the preceding half cycle.

The amplitude information read out from the PROM 87 in channel 89 is passed to register 153 and thence after conversion in a digital-to-analogue converter 154 to the control input of an amplifier 155 having a variable gain controlled by signals applied to its control input. Thus an amplitude in accordance with the amplitude information is imparted to the signal from the amplifier circuit 105.

Where following the omission of symbols during encoding, it is required to insert symbols during decoding the read input to the gate 123 can be enabled after each half cycle of reconstruction to read the same information from the FIFO 96 as was previously read. In this way one symbol can be repeated several times. By enabling the dump terminal of the OR gate 127, symbols read into the FIFO 96 can be dumped and therefore omitted. This is a facility which is useful in the reconstruction of helium speech where the FIFO 96 would be coupled direct to the counters 61 and 73 of FIG. 7.

It will be apparent that the invention may be put into effect in many other ways from those specifically described. For example the circuits and logic specifically mentioned may be replaced by alternatives and the system may be redesigned, for example, following the many different criteria discussed in the specification. For example the circuits and logic may be replaced in whole or in part by computer, but where digital computers are used analogue-to-digital converters may be required for input signals and digital-to-analogue converters may be required to provide output signals. Thus the whole of FIG. 1, for example, to the right of the A/D converter may be replaced by a computer comprising a microprocessor, and the whole of FIG. 4 at least to the left of the circuit 55 may be replaced by a similar type of computer with the addition of a D/A convertor. The programming and assembly of such computers will be apparent to those skilled in the microprocessor art from the above description and drawings, FIGS. 1 and 4 being easily changed into appropriate flow charts. Where encoding and decoding at the same location, for example for dealing with helium speech, or decoding from stored symbols is carried out, a single computer, for instance of the type outlined, may be used. Thus the five aspects of the invention as covered by the claims below include methods and apparatus comprising computers.

Coding and decoding will be different according to the application for which the invention is used. In processing helium speech for example there is no requirement to economise in bandwidth and usually no need to transmit coded signals over more than short or very short distances. Symbols are then omitted on a systematic basis so that there are fewer symbols per unit time and passed to a reconstruction circuit which may be a modified version of the reconstruction circuit 47. A waveform for audio reproduction equipment is then generated by stretching the duration of each encoded half cycle, in addition to providing the required number of minima. In this way the pitch of the helium speech is reduced and the speech is made intelligible.

Alternatives to linear digitising as carried out by the A/D convertor 11 and subsequent encoding may be employed. For example use may be made of a linear delta-modulator digitiser in which an analogue signal is applied to a comparator where it is compared with, for example, the integrated comparator output, a "1" being generated if the analogue signal is larger than the integrated output and a "0" being generated otherwise. Thus a delta-mod output 1111111100000 would indicate a polarity maxima or a polarity minima, dependent upon the sign of the output of the voltage comparator and "second signals" can be derived. RZs (and other features of shape) can also be derived from the delta-mod output, in known ways, allowing "first signals" to be obtained.

Other digitising options are available to provide a time coded format. One simple version for use when low frequency background noise is absent is the 'Two Channel Count' Time Coder. Here, the RZ time intervals of the original input waveform are quantised and counted to give "first signals" and, in parallel with this operation the RZ time intervals of the differentiated input waveform are counted to give "second signals" and the two counts combined after allowances have been made (in the logic circuitry) for the phase shifts and time delays associated with the differentiating network.

We claim:

1. A method of encoding and decoding an input signal having at least an alternating component comprising the steps of:

generating a succession of first signals, each of said first signals being related to the duration of a corresponding sub-division of said input signal;

generating a succession of second signals, each of said second signals being related to at least one characteristic of waveform shape of a corresponding said sub-division, said first and second signals being the encloded form of said input signal;

transferring said first and second signals along a channel as a result of which said first and second signals are transformed into related third and fourth signals, respectively; and generating an analogue signal in response to said third and fourth signals, said analogue signal having sub-divisions of durations related to said third signals, each said sub-division of said analogue signal having a shape related to a corresponding one of said fourth signals, said sub-divisions being defined by any predetermined characteristic of said input signal waveform so long as said input signal alternating component does not have more than three zero crossings in any of said sub-divisions.

2. A method according to claim 1 wherein said transferring step includes the step of transmitting a transmission signal related to said first and second signals from a first location to a remote second location.

3. A method of encoding an input signal having at least an alternating component comprising the steps of:

generating a succession of first signals, each of said first signals being related to the duration of a corresponding sub-division of said input signal;

generating a succession of second signals, each of said second signals being one of a set of predetermined signals and related to at least one characteristic of waveform shape of a corresponding said sub-division, said sub-divisions being defined by any predetermined characteristic of said input signal waveform so long as said input signal alternating component does not have more than three zero crossings in any of said sub-divisions, and the encoding being such that a useful reconstruction of a signal which has been encoded can be carried out from said first and second signals only.

4. A method according to claim 3 wherein each subdivision is substantially a half cycle of said input signal.

5. A method according to claim 4 wherein each second signal is related to the number of predetermined events occurring in a sub-division of the signal to be encoded.

6. A method according to claim 4 wherein each event is the occurrence of a predetermined type of complex zero of said input signal.

7. A method according to claim 6 wherein each second signal is related to the number of one or more of the following: magnitude minima, magnitude maxima, and points of inflection occurring in a half cycle.

8. A method according to claim 3 wherein:

said method further comprises the step of comparing said input signal with a datum which is offset from zero; and said first signal generating step further comprises the step of determining the interval between at least one of real zeros, pseudo zeros, and interpolation zeros with respect to said datum and generating said first signals in response to said determining step.

9. A method according to claim 3 wherein said subdivisions are half cycles of said input signal and said method further comprises the step of encoding successive half cycles as successive first signals and successive second signals.

10. A method according to claim 3 wherein successive half cycles of said input signal occur, at least at times, in groups which are substantially the same, and said first and second signal generating steps comprises the steps of deriving said first signals and second signals from at least one but not all of the half cycles in each group.

11. A method according to claim 3 further comprising the step of associating said first and second signals in pairs, the first signal of each pair relating to the same sub-division as the second signal of that pair.

12. A method according to claim 11 further comprising the step of coding each of said pairs as a secondary signal selected from a plurality of predetermined possible secondary signals.

13. A method according to claim 12 wherein said coding step further comprises the step of selecting one possible secondary signal in response to any of a group of said pairs having at least one of said first and second signals closely related.

14. A method according to claim 3 comprising the step of limiting the bandwidth of said input signal before said first and second signal generating steps in order to reduce the number of possible second signals which can be generated.

15. Apparatus for encoding and decoding an input signal having at least an alternating component comprising:

means for generating a succession of first signals, each of said first signals being related to the duration of a corresponding sub-division of said input signal;

means for generating a succession of second signals, each of said second signals being related to at least one characteristic of waveform shape of a corresponding said sub-division, said first and second signals being the encoded form of said input signal; and means for generating an analogue signal in response to third and fourth signals related to said first and second signals, respectively, said analogue signal having sub-divisions of durations related to said third signals, each sub-division of said analogue signal having a shape related to a corresponding one of said fourth signals, said sub-divisions being defined by any predetermined characteristic of said input signal waveform so long as said input signal alternating component does not have more than three zero crossings in any of said sub-divisions.

16. Apparatus for encoding an input signal, comprising:

means for generating a succession of first signals, each of said first signals being related to the duration of a corresponding sub-division of said input signal;

means for generating a succession of second signals, each second signal being one of a set of predetermined signals and being related to at least one characteristic of waveform shape of a corresponding sub-division, each said sub-division being defined by any predetermined characteristic of said input signal waveform so long as said input signal alternating component does not have more than three zero crossings in any of said sub-divisions, and the apparatus being such that a useful reconstruction of a signal which has been encoded can be carried out from said first and second signals only.

17. Apparatus according to claim 16 wherein each sub-division is substantially a half cycle of the signal to be encoded.

18. Apparatus according to claim 17 wherein said first signal generating means includes means for providing first signals related to the intervals between successive zeros of one of the following types: real zeros, pseudo zeros and interpolation zeros.

19. Apparatus according to claim 17 wherein said first signal generating means includes means for generating digital signals each related to the length of a half cycle and said second signal generating means includes means for generating digital signals related to the number of events in a half cycle.

20. Apparatus according to claim 19 wherein said events signals generating means includes means for generating digital signals related to the number of a predetermined type of complex zeros in a half cycle of said input signal.

21. Apparatus according to claim 19 wherein said events signals generating means includes means for generating digital signals related to the number of events of at least one of the following types in each half cycle: magnitude maxima, magnitude minima, and points of inflection.

22. Apparatus according to claim 21 wherein said events signals generating means comprises an analogue-to-digital converter for converting said input signal into digital samples, a comparator for comparing the magnitudes of successive samples to detect the occurrence of at least magnitude minima in said input signal, and a first counter coupled to the output of said comparator for counting the number of occurrences detected by said comparator.

23. Apparatus according to claim 22 wherein said lengths signals generating means comprises a pulse generator, a second counter coupled to the pulse generator, and means for resetting the second counter at the end of each half cycle of said input signal, whereby the second counter provides a count representing the duration of each half cycle.

24. Apparatus according to claim 23 wherein said analogue-to-digital converter has an output terminal at which a polarity signal representative of the polarity of the said samples appears, and said second counter is coupled to the said terminal to be reset when the polarity signal changes.

25. Apparatus according to claim 23 wherein said events signals and lengths signals generating means further comprise logic means coupled to said comparator for generating a pseudo-zero signal each time a first maximum magnitude occurs in a half cycle of said input signal and means for resetting the second counter each time a pseudo-zero signal occurs.

26. Apparatus according to claim 16 further comprising means for bandwidth limiting said input signal before application to the means for generating the first and second signals.

27. Apparatus according to claim 16 further comprising means for generating secondary signals and means for applying pairs of first and second signals corresponding to the same sub-division to said means for generating secondary signals, each secondary signal being provided from a plurality of predetermined possible secondary signals in accordance with a pair of first and second signals.

28. Apparatus according to claim 27 wherein said means for generating secondary signals includes means for providing the same secondary signal in response to any of a group of said pairs of signals having closely related first signals.

29. Apparatus according to claim 23 further comprising means for generating secondary signals including a programmable read-only memory with the outputs of said first and second counters coupled to address terminals of said memory.

30. Apparatus according to claim 29 further comprising sequence-reduction logic responsive to said secondary signal generating means for omitting secondary signals on a systematic basis.

31. Apparatus according to claim 30 wherein said sequence-reduction logic includes means for recognising at least one secondary signal and for omitting at least one successive secondary signal after each said one recognized signal.

32. Apparatus according to claim 17 further comprising means for providing an amplitude signal related to the average peak amplitude over a plurality of half cycles of said input signal, and means for coding said amplitude signal for transmission with the first and second signals or the secondary signals.

33. Apparatus according to claim 17 further comprising means for providing a packing signal for each coded half cycle related to the position of derived complex zeros in the half cycle, and means for coding the packing signal for transmission with the first and second signals or the secondary signal.

34. A method of constructing an output signal having at least an alternating component from a succession of first signals related to the duration of sub-divisions of said output signal, and a succession of second signals related to at least one characteristic of shape of said output signal sub-divisions, the method comprising the step of generating an analogue signal having sub-divisions of durations related to said first signals, each said sub-division of said analogue signal having a shape related to a corresponding one of said second signals, said sub-divisions being defined by any predetermined characteristic of said output signal waveform so long as said output signal alternating component does not have more than three zero crossings in any of said sub-divisions.

35. A method according to claim 34 wherein each second signal is a signal from a set of predetermined signals and each sub-division shape in the analogue signals is from a set of predetermined shapes.

36. A method according to claim 34 wherein said second signals are each related to the number of predetermined events occurring in a half cycle of said output signal, and each half cycle of the said analogue signal has a number of said events related to a corresponding said second signal.

37. Apparatus for constructing an output signal having at least an alternating component from a succession of first signals related to the duration of sub-divisions of said output signal, and a succession of second signals related to at least one characteristic of shape of said output signal sub-divisions, the apparatus comprising means for generating an analogue signal having subdivisions with durations related to said first signals, each said sub-division of said analogue signal having a shape related to a corresponding one of said second signals, each said sub-division being defined by any predetermined characteristic of said output signal waveform so long as said output signal alternating component does not have more than three zero crossings in any of said sub-divisions.

38. Apparatus according to claim 37 wherein said first signals each are related to the duration of a half cycle and the means for generating an analogue signal includes means for generating analogue signal half cycles of durations related to said first signals.

39. Apparatus according to claim 38 wherein said second signals each are related to the number of events occurring in a half cycle of said output signal, and said means for generating an analogue signal includes means for generating half cycles each having a number of events related to a corresponding said second signal.

40. Apparatus according to claim 39 wherein said means for generating analogue signals further comprises circuit means for providing constant voltages at four different levels for intervals of constant duration, the four levels being a comparatively high positive level, a comparatively low positive level, a comparatively low negative level and a comparatively high negative level, means for causing said circuit means to provide, for each half cycle of said analogue signal, constant voltages of one polarity for a number of said constant-duration intervals proportional to a respective one said first signal, the constant voltages being at differing said levels determined by a respective one said second signal.

41. Apparatus according to claim 40 wherein second signals are related to the number of minima in half cycles of said output signal, and said circuit means includes means for providing in each half cycle, voltage at a high said level for N of the said intervals, then voltage at a low said level for N of the said intervals and so on until M groups of N said intervals have elapsed, where M equals twice the number of minima in a half cycle of said output signal plus one, and N represents the length of the half cycle divided by M.

42. Apparatus according to claim 41 wherein said circuit means further comprises means for deriving M signals and N signals representative of M and N, respectively, and control means for controlling the said circuit for providing constant voltages in accordance with the M signals and N signals.

43. Apparatus according to claim 42 wherein said output signal is further constructed from information relating to the position of derived complex zeros in each half cycle in the form of numbers $P_1$ and $P_2$, where $P_1$ and $P_2$ relate to intervals in each half cycle before the first, and after the last, derived complex zero, respectively, and the apparatus includes control means for said circuit means for providing constant voltages at high level for numbers of the said intervals proportional to $P_1$ and $P_2$ at the beginning and end, respectively, of each half cycle of analogue signals.

44. Apparatus according to claim 37 further comprising decode-mapping logic for deriving from each of a plurality of secondary signals, the pair of first and second signals which corresponds to that secondary signal.

45. Apparatus according to claim 44 wherein said decode-mapping logic comprises a programmable read-only memory connected to receive signals representing secondary signals at its address terminals and to provide pairs of the said first and second signals at its output terminals.

46. Apparatus according to claim 27 wherein each first signal represents the duration of a half cycle and each second signal represents one of the following: the number of magnitude maxima in a said sub-division, the number of magnitude minima in a said sub-division and the number of points of inflection in a said sub-division.

47. Apparatus for encoding varying signals comprising a computer programmed to encode said varying signals by generating a succession of first signals, each of which represents the duration of a sub-division of a signal to be encoded, and generating a succession of second signals, each second signal being one of a set of predetermined signals, each of which represents at least one characteristic of waveform shape of a said sub-division of the signal to be encoded, each said sub-division being any portion of the signal to be encoded which is defined in any systematic way which depends on a characteristic of the signal waveform and which results in sub-divisions having not more than three zero crossings in the alternating component of the signal to be encoded.

48. Apparatus for encoding varying signals comprising a computer programmed to construct a signal from a succession of first signals each representing the duration of a sub-division in a specific signal, and a succession of second signals, each representing at least one characteristic of shape of a said sub-division of the specific signal, the computer generating an analogue signal having sub-divisions of durations derived from durations as represented by the said first signals, each said sub-division of the analogue signal having a shape derived from a shape as represented by a second signal, the said sub-divisions in the specific signal and the analogue signal each being any portion of the signal which is defined in any systematic way which depends on a characteristic of the signal waveform and which results in sub-divisions having not more than three zero crossings in the alternating component of the signal.

49. Apparatus according to claim 15 wherein at least part of said means for generating a succession of first and second signals takes the form of a programmed computer.

50. Apparatus according to claim 37 wherein at least part of said means for generating an analogue signal takes the form of a programmed computer.

* * * * *